US007227893B1

(12) United States Patent
Srinivasa et al.

(10) Patent No.: US 7,227,893 B1
(45) Date of Patent: Jun. 5, 2007

(54) APPLICATION-SPECIFIC OBJECT-BASED SEGMENTATION AND RECOGNITION SYSTEM

(75) Inventors: Narayan Srinivasa, Moorpark, CA (US); Swarup S. Medasani, Thousand Oaks, CA (US); Yuri Owechko, Newbury Park, CA (US); Deepak Khosla, Calabasas, CA (US)

(73) Assignee: XLabs Holdings, LLC, Los Angeles, CA (US)

( * ) Notice: Subject to any disclaimer, the term of this patent is extended or adjusted under 35 U.S.C. 154(b) by 818 days.

(21) Appl. No.: 10/646,585

(22) Filed: Aug. 22, 2003

Related U.S. Application Data

(60) Provisional application No. 60/405,346, filed on Aug. 22, 2002.

(51) Int. Cl.
*H04N 7/18* (2006.01)
(52) U.S. Cl. .......................... 375/240.08; 375/240.16; 348/155; 348/169
(58) Field of Classification Search ........................ 375/240.08–240.19; 348/142–175
See application file for complete search history.

(56) References Cited

U.S. PATENT DOCUMENTS

| | | | | |
|---|---|---|---|---|
| 5,896,176 A | * | 4/1999 | Das et al. | 375/240.15 |
| 6,307,964 B1 | * | 10/2001 | Lin et al. | 382/203 |
| 6,728,314 B2 | * | 4/2004 | Kan et al. | 375/240.12 |
| 6,731,799 B1 | * | 5/2004 | Sun et al. | 382/173 |
| 6,987,883 B2 | * | 1/2006 | Lipton et al. | 382/173 |

* cited by examiner

*Primary Examiner*—Andy Rao
(74) *Attorney, Agent, or Firm*—Richard Ballard

(57) ABSTRACT

A video detection and monitoring method and apparatus utilizes an application-specific object based segmentation and recognition system for locating and tracking an object of interest within a number of sequential frames of data collected by a video camera or similar device. One embodiment includes a background modeling and object segmentation module to isolate from a current frame at least one segment of the current frame containing a possible object of interest, and a classification module adapted to determine whether or not any segment of the output from the background modeling apparatus includes an object of interest and to characterize any such segment as an object segment. An object segment tracking apparatus is adapted to track the location within a current frame of any object segment and to determine a projected location of the object segment in a subsequent frame.

42 Claims, 10 Drawing Sheets

APPLICATION-SPECIFIC OBJECT-BASED SEGMENTATION AND RECOGNITION SYSTEM

This application claims the benefit of U.S. Provisional Application No. 60/405,346 filed Aug. 22, 2002.

SOFTWARE SUBMISSION

Accompanying this application is a duplicate set of CD-ROMs, labeled as "COPY 1 REPLACEMENT Jun. 11, 2004" and "COPY 2 REPLACEMENT Jun. 11, 2004", respectively. Each disc includes a copy of the software files identified in Table 1, which are currently utilized by the inventors in implementing the invention as disclosed in this application. The entire contents of each CD-ROM are hereby incorporated by reference as if the source code and all files were printed out and included in the text of this application.

TABLE 1

Contents of Accompanying CD-ROM

| Filename | Date Created | Size (bytes) |
| --- | --- | --- |
| AVIReader.cpp | Jul. 2, 2003 | 4,150 |
| AVIReader.h | Jul. 2, 2003 | 1,120 |
| AVIWriter.cpp | Aug. 26, 2002 | 5,028 |
| AVIWriter.h | Aug. 26, 2002 | 1,447 |
| classdata.dat | Jul. 3, 2003 | 1,217,616 |
| d041002b_v.dat | Apr. 10, 2002 | 3,849 |
| d041002b_w.dat | Apr. 10, 2002 | 43,002 |
| Engine.h | Jul. 1, 2003 | 1,367 |
| Engineaviimage.cpp | Jul. 3, 2003 | 29,239 |
| Engineaviimagefastslowclassifier.cpp | Jul. 3, 2003 | 29,239 |
| Engineaviimagefastslowclassifiertrackandvote.cpp | Jul. 10, 2003 | 26,376 |
| Engineaviimagefastslowclassifiertrackandvotev2.cpp | Jul. 10, 2003 | 26,651 |
| Engineaviimagefusionclassifier.cpp | Jul. 8, 2003 | 34,892 |
| Engineaviimagefusionclassifierhome.cpp | Jul. 8, 2003 | 18,640 |
| Enginesampledimage.cpp | Jul. 1, 2003 | 16,884 |
| FindPedestrians.cpp | Jul. 9, 2003 | 4,638 |
| FindPedestrians.h | May 1, 2002 | 361 |
| Image.cpp | Jul. 2, 2003 | 5,974 |
| Image.h | Jul. 2, 2003 | 1,415 |
| JUL01090000avi.dat | Jul. 10, 2003 | 13,705 |
| Jul01100000avi.dat | Jul. 10, 2003 | 103,888 |
| Jul01109000avi.dat | Jul. 10, 2003 | 13,705 |
| Jul01110000avi.dat | Jul. 10, 2003 | 19,518 |
| Jun30170000avi.dat | Jul. 10, 2003 | 36,447 |
| MainFrm.cpp | Jul. 1, 2003 | 2,511 |
| MainFrm.h | Jul. 1, 2003 | 1,581 |
| motion.cpp | Jul. 10, 2003 | 3,042 |
| motion.h | Jul. 3, 2003 | 450 |
| NDA.cpp | Mar. 6, 2002 | 3,635 |
| NDA.h | Mar. 6, 2002 | 587 |
| Pfeat_ped.h | Oct. 4, 2002 | 1,926 |
| PfeatMMX_ped.cpp | Oct. 4, 2002 | 22,143 |
| ReadMe.txt | Jul. 1, 2003 | 4,407 |
| resource.h | Jul. 1, 2003 | 690 |
| SRFeatures_wobtstrp_es_101502_n20_v.dat | Oct. 16, 2002 | 778 |
| SRFeatures_wobtstrp_es_101502_n20_w.dat | Oct. 16, 2002 | 8,397 |
| SRFeatures_wobtstrp_fusion_101502_v.dat | Oct. 16, 2002 | 96 |
| SRFeatures_wobtstrp_fusion_101502_w.dat | Oct. 16, 2002 | 1,391 |
| SRFeatures_wobtstrp_wv_101502_n20_v.dat | Oct. 16, 2002 | 3,399 |
| SRFeatures_wobtstrp_wv_101502_n20_w.dat | Oct. 16, 2002 | 29,874 |
| StdAfx.cpp | Jul. 1, 2003 | 212 |
| StdAfx.h | Jul. 1, 2003 | 1,054 |
| testpdata.dat | Jul. 2, 2003 | 891,476 |
| testpdata1.dat | Jul. 2, 2003 | 297,291 |
| testpdata2.dat | Jul. 2, 2003 | 297,291 |
| testpdata3.dat | Jul. 2, 2003 | 297,291 |
| wavelet_150D_091701_v.dat | Sep. 17, 2001 | 3,398 |
| wavelet_150D_091701_w.dat | Sep. 17, 2001 | 29,848 |
| wavelet_MMX.h | Jul. 1, 2003 | 1,398 |
| Wavelet_MMX_new.cpp | Mar. 4, 2002 | 16,677 |
| wavesym_190D_102401_full00_v.dat | Oct. 24, 2001 | 4,158 |
| wavesym_190D_102401_full00_w.dat | Oct. 24, 2001 | 47,084 |
| wavesym_190D_102401_full01_v.dat | Oct. 24, 2001 | 4,158 |
| wavesym_190D_102401_full01_w.dat | Oct. 24, 2001 | 47,033 |
| wavesym_190D_102401_full02_v.dat | Oct. 24, 2001 | 4,158 |
| wavesym_190D_102401_full02_w.dat | Oct. 24, 2001 | 47,257 |
| wavesym_190D_102401_full03_v.dat | Oct. 24, 2001 | 4,158 |
| wavesym_190D_102401_full03_w.dat | Oct. 24, 2001 | 46,967 |
| wavesym_190D_102401_full04_v.dat | Oct. 24, 2001 | 4,158 |
| wavesym_190D_102401_full04_w.dat | Oct. 24, 2001 | 47,123 |

TABLE 1-continued

Contents of Accompanying CD-ROM

| Filename | Date Created | Size (bytes) |
|---|---|---|
| wavsym_190D_091801_v.dat | Sep. 21, 2001 | 4,158 |
| wavsym_190D_091801_w.dat | Sep. 21, 2001 | 47,071 |
| worldscape.cpp | Jul. 1, 2003 | 4,013 |
| worldscape.h | Jul. 1, 2003 | 1,400 |
| worldscapeDoc.cpp | Jul. 1, 2003 | 1,822 |
| worldscapeDoc.h | Jul. 1, 2003 | 1,519 |
| worldscapeView.cpp | Jul. 8, 2003 | 4,971 |
| worldscapeView.h | Jul. 8, 2003 | 2,805 |
| wvlet_features_comprehensive_042301_150D.txt | Apr. 25, 2001 | 940 |

FIELD OF THE INVENTION

The present invention relates to video-based recognition and tracking systems for recognizing within the frames of digitally-based video data an object of interest against a background of objects not of interest, and for confirming that the object is of the type that is desired to be detected, e.g., a human intruder for a security type system, and continuing to track the object and confirm its categorization as an object of interest.

RELATED APPLICATIONS

This application is related to the contemporaneously filed applications of the common assignee of this application having the same inventors and having Ser. Nos. 10/646,573 & 10/646,223, respectively, the disclosures of which are hereby incorporated by reference.

BACKGROUND OF THE INVENTION

It is well known, e.g., as evidenced by products offered by various companies, e.g., PacketVideo that video can be optimized for transmission, compressed in a manner compatible with an object-based video compression algorithm, e.g., MPEG-4, and this can be done from a wireless networking point-of-view. Existing systems, e.g., implementing Internet video security/monitoring services, such as Xanboo, can provide neither object-based compression nor automatic video recognition capabilities. Current security systems utilize infrared or ultrasound motion sensors to detect intruders. These sensors are often triggered by pets or wind, or the like, resulting in high false alarm rates. In existing systems the video cameras will often not capture the source of an intruder alarm, leaving the user not knowing if the alarm is a true false alarm (and if it is, what caused it) or if the alarm was caused by an intruder who is not in the camera field of view. Changes in the background due to lighting or uninteresting objects often result in additional segmented objects being sent to the object-based video compression module being employed in the prior art systems, which further detracts from the compression ratio or results in a loss in video quality or both. Prior art systems are also deficient in their capabilities of labeling the intruder objects and/or tracking of the intruder's movements.

While the preferred embodiment of the present invention is discussed in the context of a home and/or business security system, the system can also be used for various other applications, including, e.g., a wide variety of video detection/monitoring applications. Opportunities exist, e.g., for video based monitoring systems, e.g., in such areas as streaming web video over both wired and wireless networks. Real-time video streaming, in which the user sees events as they occur with full motion, can be useful in many applications, including ones like that of the present invention, which can result in new and compelling applications. This can especially be true for video streaming to wireless devices such as PDAs or other hand held or otherwise very portable personal computing devices.

Visual recognition/detection/monitoring technology is applicable to a wide variety of applications, e.g., for the infrastructure of webcams, PDA's, cell phone video cameras, and other types of digital video cameras that are now being built and/or developed. The present invention can be used as the basis for a number of applications, including: indoor/outdoor home and business security products and services; employee monitoring and tracking; traffic monitoring; parking lot surveillance; parking assistance at parking facilities; information/advertisement video streams for malls, theatres, parks, restaurants, etc.; computer, video-game, kiosk, television interaction and control (insertion of users into a video or computer environment, e.g., an inexpensive camera attached to or installed in a television settop box could be used to insert users into digital environments transmitted over cable or satellite links and the user could then interact with the environment through various gestures or movements); semi-automatic object segmentation of video for the entertainment industry; video peer-to-peer applications where users can share or swap efficiently compressed video streams; and video conferencing using portable devices; in each of which cases, the existing systems suffer from defects correctable by utilizing the concepts of the present invention.

Current security systems utilize infrared or ultrasound motion sensors to detect intruders. These sensors are often triggered by pets or wind, resulting in high false alarm rates. Existing computer-vision-based video surveillance systems such as Pfinder suffer from a variety of drawbacks, e.g., they can often incorrectly segment objects in the scene, e.g., if a drastic change occurs in illumination or, e.g., there is a drastic change in the environment/scene content, including, e.g., changes in position or movement or the occlusion of part or all of the object being detected, e.g., an intruder in the field of view of a security camera.

MPEG4, by way of example, introduces the notion of object-based compression that can greatly increase compression efficiency. The MPEG4 standard does not specify object extraction methods. Although many video object plane (VOP) extraction methods exist, it is common knowledge that the task of segmenting a variety of video streams is non-trivial. Most current video streaming systems do not even attempt to use object-based compression schemes, e.g. those found in MPEG4.

Prior attempts to recognize objects utilizing video recognition/detection, therefore, have not been successful in reducing the false alarms effectively. Statistics in the security industry clearly suggest that the frequent occurrence of false alarms has been the bane of the industry. Lower false alarm rates would help in gaining wider acceptability of the security systems. Currently also, bandwidth constraints and the like limit the information of need for remote receipt and utilization of the video object data indicative of a detection, e.g., of an object of interest, e.g., of an intruder, that can be processed and sent, e.g., over wired or wireless telephone lines or other forms of networked communication, including, e.g., LANs, WANs, the Internet and/or the World Wide Web or combinations thereof.

A number of recent market and technological trends are now converging to form new applications and opportunities for streaming video, e.g., over both wired and wireless networks. Streaming video standards have become very popular since they eliminate the need to download an entire video file before the video can start. Streaming video, e.g., over the Internet allows real-time viewing of events by remote users. Inexpensive and compact streaming video sensors such as video cameras on computers, Internet appliances, PDAs, and cell phones are becoming available. Many types of inexpensive webcams are already widely available for PCs. Video sensors are becoming available on less expensive and more mobile platforms also. For example, Kyocera Corp. has already introduced its Visual Phone VP-210 cell phone, which contains a built-in video camera, while a video camera add-on is available for the Visor PDA. Even the Nintendo Gameboy has a video camera accessory.

The Internet infrastructure for streaming video over both wired and wireless links is also being constructed rapidly. A number of recent startups such as iClips and Earthnoise already have web sites on-line for sharing user-supplied streaming video clips. Companies such as Akamai are creating technology, which brings video content out to the "edges" of the Internet, away from congestion and closer to the end-user. In order to facilitate the "edge-based" delivery of content, the Internet Content Adaptation Protocol (ICAP) is now being formulated by a large group of Internet companies. (See www.i-cap.org) ICAP allows the adaptation of services such as streaming video to the needs of the client device. In the wireless area, 2.5 and third-generation standards are emerging with higher bandwidths and capabilities for transmitting video information to cell phones and PDAs. PacketVideo is already demonstrating delivery of compressed video to various wireless devices, as is DoCoMo in Japan using 3G cell phones. Geolocation will become ubiquitous through the proliferation of GPS as well as cellular geolocation driven by the forthcoming E911 position locating regulations. Geolocation will enable many new location-specific services for mobile streaming video devices.

A wide variety of attractive applications are being considered and evaluated in the area of streaming web video over both wired and wireless networks. Real-time video streaming, in which the user sees events as they occur with full motion, will generate even more new and compelling applications. This can be especially true, e.g., for video streaming to wireless devices such as PDAs.

Existing Internet video security/monitoring services such as Xanboo can provide neither object-based compression nor automatic video recognition capabilities. Current security systems with non-video detection, e.g., with infrared or ultrasound or the like motion sensors suffer from the above noted defects, among others, leading to high false alarm rates.

Classical motion segmentation algorithms attempt to partition frames into regions of similar intensity, color, and/or motion characteristics. Object segmentation approaches can be broadly divided into three main types: direct intensity or color based methods, motion vector based methods, and hybrid methods. The direct intensity or color-based methods are usually based on a change detection mask (CDM) that separates moving and stationary regions. Change detection algorithms mostly rely on either a background subtraction method or a temporal difference method. They are suitable for real-time segmentation of moving regions in image sequences because of low computational complexity.

Background subtraction methods, e.g., as discussed in Skifstad, K. D. and Jain, R. C., "Illumination Independent Change Detection for Real World Image Sequences," *Computer Vision. Graphics and Image Processing* 46(3): 387-399 (1989) (Skifstad and Jain 1989); Long, W. and Yang, Y. H., "Stationary Background Generation: An Alternative to the Difference of Two Images," *Pattern Recognition* 23: 1351-1359 (1990) (Long and Yang 1990); Ridder, C., et al., "Adaptive background estimation and foreground detection using Kalman filtering," Proceedings of International Conf. on recent Advances in Mechatronics, ICRAM'95, Istanbul, Turkey (1995) (Ridder et al. 1995); Kuno, Y. and Watanabe, T., "Automated detection of human for visual surveillance system," ICPR96, Vienna, Austria (1996) (Kuno and Watanabe, 1996); Makarov, A., "Comparison of Background Extraction Based Intrusion Detection Algorithms," ICIP96 (1996) (Markarov 1996); Eveland, C., et al., "Background Modeling for Segmentation of Video-rate Stereo Sequences," CVPR98 (1998) (Eveland, et al., 1998); Stauffer, C. and Grimson, W. E. L., "Adaptive Background Mixture Models for Real-time Tracking," CVPR99 (1999) (Stauffer and Grimson, 1999); Toyama, K., et al., "Wallflower: Principles and Practice of Background Maintenance" ICCV99 (1999) (Toyama, et al. 1999); Elgammal, A., et al., "Non-Parametric Model for Background Subtraction" ECCV00 (2000) (Elgammal, et al. 2000); Haritaoglu, I., et al. "A Fast Background Scene Modeling and Maintenance for Outdoor Surveillance," ICPR00 (2000) (Haritaoglu, et al. 2000); Ivanov, Y. A., et al., "Fast Lighting Independent Background Subtraction," *IJCV* 37(2): 199-207 (2000) (Ivanov, 2000); Seki, M., et al., "A Robust Background Subtraction Method for Changing Background," WACV00 (Seki, et al. 2000); and Ohta, N. A Statistical Approach to Background Subtraction for Surveillance Systems, ICCV01 (2001) (Ohta 2001), the disclosures of each of which are hereby incorporated by reference, compare the intensity or color of the observed images with that of the background to identify foreground/background regions. The background is either previously acquired using an empty scene or is estimated and updated dynamically. Adaptive background methods, such as those discussed in Collins, R., et al., "A system for video surveillance and monitoring," Proceedings of the American Nuclear Society (ANS) Eighth International Topical Meeting on Robotics and Remote Systems (1999) (Collins, et al. 1999); Skifstad and Jain, 1989, Ridder, et al., 1995, Hotter, M., et al., "Detection of moving objects using a robust displacement estimation including a statistical error analysis," ICPR96, Vienna, Austria (1996) (Hotter et al., 1996); Amamoto, N. and Matsumoto, K., "Obstruction detector by environmental adaptive background image updating," 4th World Congress on Intelligent Transport Systems, Berlin (1997) (Amamoto and Matsumoto, 1996); Wren, C., "Pfinder: Real-time tracking of the human body," IEEE Transactions on Pattern Analysis and Machine Intelligence, 19(7): 780-785 (1997) (Wren, 1997); Horprasert, T., et al., "A Statistical Approach for Real-time Robust Background Subtraction and Shadow Detection." Proc. IEEE ICCV'99 FRAME-RATE Workshop (1999) (Horprasert, et al., 1999); and Huwer, S. and Niemann., H., "Adaptive change detection for real-time surveillance applications," Third IEEE International Workshop on Visual Surveillance VS00, Dublin, Ireland (2000) (Huwer and Niemann, 2000); the disclosures of which are hereby incorporated by reference, can be crucial for real-world scenes when the background or illumination changes, otherwise background elements can be erroneously included in foreground. The numerous approaches to this problem differ in the type of background model used and the procedure used to update the model. Most of the background estimation methods use statistical methods to represent as well as update the background. Wren et al., 1997 discusses a model for the background pixels as a single Gaussian whose means and variances are updated continuously. Stauffer and Grimson, 1999, model each pixel as a mixture of Gaussians and use an on-line approximation to update the model. Seki et al., 2000 propose a robust background subtraction method for changing background by expressing changes in the background using a multi-dimensional image vector space and learning the chronological changes in terms of distribution of these vectors. These methods can produce holes in computed foreground if, e.g., color or intensity matches the background.

Temporal differencing methods, as discussed, e.g., in Makarov, A., et al., "Intrusion Detection Using Extraction of Moving Edges," *IAPR Int. Conf. On Pattern Recognition ICPR*94, 1994 (Makarov, 1994), and Paragious, N. and Tziritas, G. "Detection and location of moving objects using deterministic relaxation algorithms," ICPR96, Vienna, Austria (1996) (Paragious and Tziritas, 1996), the disclosures of which are hereby incorporated by reference, subtract consecutive images followed by thresholding to detect the region of change which can then be attributed to moving foreground. These methods are suited for detection of moving objects and can adapt to changing light conditions quickly. However, these methods will fail to detect objects that were previously moving but become stationary or more or less stationary. Hybrid approaches, such as discussed in Amamoto and Matsumoto, 1997 and Huwer and Niemann, 2000, based on a combination of background subtraction and temporal differencing have also been proposed. Unlike previous simple and hybrid methods, Huwer and Niemann, 2000 discuss adapting the background model only on regions detected by the temporal difference method in order to avoid reinforcement of adaptation errors.

Motion methods estimating a dense motion field followed by segmentation of the scene based only on this motion information have been discussed, e.g., in Adiv, G., "Determining three-dimensional motion and structure from optical flow generated by several moving objects." IEEE Transactions on Pattern Analysis and Machine Intelligence, PAMI-7: 384-401 1985 (Adiv, 1985), and Chang, M. M., et al., "Motion-field segmentation using an adaptive MAP criterion," ICASSP93, Minneapolis, Minn. (1993) (Chang, et al., 1993), the disclosures of which are hereby incorporated by reference. Adiv, 1985 discusses utilizing segmentation of the flow field into connected components using Hough transform and merging segments with similar 3-D motion to obtain final segmentation. Chang et al., 1993 discusses the use of both motion and intensity information for segmentation in a Bayesian framework. Simultaneous motion estimation and segmentation in a Bayesian framework has also been proposed, as discussed, e.g., in Chang, M. M., et al., "An algorithm for simultaneous motion estimation and segmentation," ICASSP94, Adelaide, Australia (1994) (Chang, et al., 1994), the disclosure of which is hereby incorporated by reference, where the intensity is the only observation and both segmentation and motion field are estimated. While these methods allow incorporation of mechanisms to achieve spatial and temporal continuity, they are generally unsuitable for real-time applications and may need a priori information about the number of objects.

Segmentation algorithms that specifically address video object plane (VOP) generation have also been proposed, many of which are part of the ISO/MPEG-4 N2 core experiment group on automatic segmentation techniques. These methods can be further divided into those that do explicit tracking vs. implicit tracking. In the implicit tracking area, e.g., as discussed by Neri, A., et al., "Automatic moving object and background segmentation," Signal Processing, 66(2): 219-232 (1998) (Neri, et al., 1998) (Neri et al. 1998), the disclosure of which is hereby incorporated by reference, involve a method for automatic segmentation by separating moving objects from a static background. Potential foreground regions (moving objects and uncovered regions) can be identified by higher order statistics on groups of interframe difference images. For example, Mech, R. and Wollborn, M., "A noise robust method for segmentation of moving objects in video sequences," IEEE Int. Conf. On Acoustics, Speech and Signal Processing, ICASSP97, Munich, Germany (1997) (Mech and Wollburn, 1997), the disclosure of which is hereby incorporated by reference, generate an initial change detection mask by temporal differencing and smoothing boundaries by local adaptive relaxation. Temporal stability can be maintained by incorporating memory about whether pixels belonged to an object or not in previous CDMs. The object mask can then be calculated from the CDMs by eliminating uncovered background and adapting to the gray level edges to improve location of boundaries. Both of these methods can, however, lose track of an object that has stopped after previously moving. Choi, J. G., et al. "Automatic segmentation based on spatio-temporal information," ISO/IEC/JTC1/SC29/WG11/MPEG97/m2091, Bristol, UK (1997) (Choi, et al., 1997), the disclosure of which is hereby incorporated by reference, discuss the use of a watershed algorithm to detect the location of object boundaries followed by a size filter that can merge small regions into neighboring regions. Every region with more than half of its pixels marked as changed in the so generated CDM can then be assigned to foreground. To enforce temporal continuity, segmentation can be aligned with a previous frame and those regions where, e.g., the majority of the pixels belonged to foreground before can be added to foreground as well. This can allow tracking an object even when it has stopped for arbitrary time. Chien, S. Y. et al., "An efficient video segmentation algorithm for realtime MPEG-4 camera system." Proceedings of Visual Communication and Image Processing (VCIP2000) (Chien, et al., 2000), the disclosure of which is hereby incorporated by reference, discuss the use of a combination of temporal differencing and background subtraction to obtain the CDM. The change detection mask can be generated using background subtraction when, e.g., the statistics of a pixel have been stationary for a period of time and temporal differencing can be utilized otherwise. Connected component labeling and region filtering can also be performed on the CDM followed by dilation in the temporal domain and smoothing the edges using, e.g., morphological opening and closing operations. Alatan, A. A., et al., "A rule based method for object segmentation in video sequences," ICIP97 (1997) (Alatan et al., 1997) present an algorithm that fuses motion, color and accumulated previous segmentation data to both segment and track objects. Rule-based processing modules use the motion information to locate objects in scene, color information to extract the true boundaries, and segmentation result of previous frame to track the object.

Wren et al., 1997 discuss a method for tracking people and interpreting their behavior by using a multi-class statistical model of color and shape to obtain a 2-D representation of, e.g., head and hands, e.g., in a wide range of viewing conditions. The method can build a model of the scene and the object, calculate whether the current frame pixels belong to the foreground, e.g., to a person or to the background scene, e.g., by tracking and updating a statistical model of the object and scene. This method, however, can fail, e.g., when sudden or large changes occur, e.g., in the scene. Meier, T. and Ngan., K. N. "Automatic segmentation of moving objects for video object plane generation," IEEE Transactions on circuits and systems for video technology 8(5) (1998) (Meier and Ngan, 1998), the disclosure of which is hereby incorporated by reference, propose to track and update the object model by Hausdorf matching. The initial object model can be derived by temporal differencing on images that have been filtered to remove, e.g., stationary objects. The VOP can be extracted from the object model.

In the explicit tracking methods area, Collins et al. discuss the detection of foreground pixels by a background subtraction method that maintains an evolving statistical model of the background, which can then be adapted to slow changes in the environment. The moving objects or blobs can be obtained by connected component labeling on foreground pixels followed by blob clustering, morphological opening and closing, and size filtering. Target tracking can then be done by matching blobs in a current frame with existing tracks using, e.g., a cost function based on blob features such as for size, color histogram, centroid and/or shape. Tracking can persist even when targets become occluded or motionless. Fieguth, P. and Terzopoulos, D., "Color-based tracking of heads and other mobile objects at video frame rates," Proceedings of the Conference on Computer Vision and Pattern Recognition (1997) (Fieguth, et al., 1997), the disclosure of which is hereby incorporated by reference, have proposed a method for object tracking based on color information only, which is robust with respect to occlusion via an explicit hypothesis-tree model of the occlusion process. They do not address, however, detection and localization of new objects to track and cannot handle very well object changes in shape, scale or color.

Although the easiest approach to object detection is using pixel intensities, it is obvious that pixel-based approaches can fail, e.g., because they do not Stake into account the structure implicit in many complex objects. Edge-based methods examine only a small local neighborhood at a fine scale. For intruder detection applications that are sometimes riddled with illumination problems the edge-based approach can often result in spurious patterns. C. Papageorgiou, T. Evgeniou and T. Poggio, "A Trainable Pedestrian Detection System," *Proc. of IEEE Intelligent Vehicles Symposium*, pp. 241-246, October (1998) (Papageorgio, et al., 1998) have suggested the application of a multi-scale approach to detect faces and pedestrians.

The problem of detecting and recognition of humans in images is a well-studied research topic. The work in this area can be broadly classified into two types: recognition based on motion cues and recognition based on shape cues. Human recognition from motion cues relies on the segmentation of objects in the scene using motion information extracted from an image stream based on techniques such as optic flow as discussed in B. Horn and B. G. Schunk (1981), "Determining Optic Flow," *Artificial Intelligence*, Vol. 17, pp. 185-203 (Horn 1981), the disclosure of which is hereby incorporated by reference, and frame differencing as discussed in O. Faugeras, "Three-Dimensional Computer Vision—A Geometric Viewpoint," MIT Press, 1993 (Faugeras 1993), the disclosure of which is hereby incorporated by reference. The segmented region is then analyzed to recognize the presence/absence of humans in the scene. In K. Rohr, "Towards model-based recognition of human movements in image sequences," *Computer Vision, Graphics and Image Processing: Image Understanding*, vol. 59, pp. 94-115, 1994 (Rohr 1994), the disclosure of which is hereby incorporated by reference, humans are recognized based on analyzing movements of objects segmented using frame-differencing and ego-motion subtraction. Texture and contour information of segmented blobs is combined with temporal gait analysis of the walking process to recognize humans, as discussed in C. Curio, J. Edelbrunner, T. Kalinke, C. Tzomakas and W. von Seelen, Walking Pedestrian Recognition, in *Proc. IEEE Intl. Conf. On Intelligent Transportation Systems*, pp. 292-297, October, 1999 (Curio 1999), the disclosure of which is hereby incorporated by reference. A stereo-based algorithm is used in C. Wohler, J. K. Aulaf, T. Portner and U. Franke, "A Time Delay Neural Network Algorithm for Real-time Pedestrian Detection," *Proc. of IEEE Intelligent Vehicles Symposium*, pp. 247-251, October, 1998 (Wohler 1998), the disclosure of which is hereby incorporated by reference, for detection and tracking of humans by classifying extracted blobs using a time-delay neural network. The neural network classifies the blob as humans based on the temporal motion patterns of the human leg. Quantitative geometric descriptions of human movements are used for human recognition in S. Wachter and H. H. Nagel, "Tracking Persons in Monocular Image Sequences," *Computer Vision and Image Understanding*, vol. 74, no. 3, pp. 174-192, June, 1999 (Wachter 1999), the disclosure of which is hereby incorporated by reference. These movements are obtained by filtering the projection of the three-dimensional person model to consecutive frames of an image sequence. There are several other approaches that also use motion cues in combination with three-dimensional kinematic models of human anatomy for human recognition, as discussed in A. Baumberg and D. Hogg, "Generating spatiotemporal models from examples," *Image and Vision Computing*, vol. 14, pp. 525-532, 1996 (Baumberg 1996); Z. Chen and H. J. Lee, "Knowledge-guided visual perception of 3-D human body movements," *IEEE Trans. Systems, Man and Cybernetics*, vol. 22, pp. 336-342, 1992 (Chen 1992); D. M. Gavrila and L. S. Davis, "3-D Model based tracking of humans in action: A multi-view approach," *Proc. IEEE Conf. On Computer Vision and Pattern Recognition*, pp. 73-80, 1996 (Gavrila 1996); Y. Guo, G. Xu and S. Tsuji, "Tracking human body motion based on a stick model," *Journal of Visual Communication and Image Representation*, vol. 5, pp. 1-9, 1994 (Guo 1994); M. K. Leung and Y. H. Yang, *First Sight: A human body outline labeling system*, IEEE Trans. On Pattern Analysis and Machine Intelligence, vol. 17, pp. 359-377, 1995 (Leung 1995); J. O'Rourke and N. I. Badler, "Model-based image analysis of human motion using constraint propagation," *IEEE Trans. On Pattern Analysis and Machine Intelligence*, vol. 78, pp. 5-43, 1995 (O'Rourke 1995); A. Pentland and B. Horowitz, *Recovery of non-rigid motion and structure*, IEEE Trans. On Pattern Analysis and Machine Intelligence, vol. 13, pp. 730-742, 1991 (Pentland 1991); C. Wren, A. Azarbayejani, T. Darrell and A. Pentland, "Pfinder: Real-Time Tracking of the Human Body," SPIE, vol. 2615, pp. 89-98, 1996 (Wren 1996); and L. Q. Xu and D. Hogg, "Neural networks in human motion tracking—An experimental study," *Proc. of 7th British Machine Vision Conference*, vol. 2, pp. 405-414, 1996 (Xu 1996), the disclosures of each of which are incorporated herein by reference. In O. Masoud and N. Papanikolopoulos, "A robust real-time multi-level model-based pedestrian tracking system," *Proc. of the ITS America Seventh Annual Meeting*, Washington D.C., June, 1997 (Masoud 1997), the disclosure of which is hereby incorporated by reference, blobs are extracted from scenes using a combination of motion cues and background models. These blobs are then analyzed for human-like movement patterns for recognition and also for Kalman filter-based tracking. Motion and size filtering operations are used to extract humanlike objects from images in S. Bouzer, J. M. Blosseville, F. Lenoir and R. Glachet, "Automatic Incident Detection: Slow Isolated Vehicle and Pedestrian Detection on Motorway Using Image Processing," *Proc. of Seventh Intl. Conf. On Road Traffic Monitoring and Control*, pp. 128-133, October, 1994 (Bouzer 1994), the disclosure of which is hereby incorporated by reference. Then a motion trajectory is established for the extracted blob and is used for human recognition.

Shape based methods exploit the intrinsic shape characteristics found in humans to aid in the recognition process. In Papageorgiou et al., 1998, a set of low-level wavelet features is extracted from examples of humans found in natural scenes in different poses. These features are then used to train a support vector machine classifier for recognition of humans. A stereo-based segmentation algorithm is applied in L. Zhao and C. Thorpe, "Stereo and Neural Network-based Pedestrian Detection, in *Proc. of IEEE Intl. Conf on Intelligent Transportation Systems*," pp. 298-303, October, 1999 (Zhao 1999), the disclosure of which is hereby incorporated by reference, to extract objects from background and then features from the extracted objects are fed to a neural network that learns to differentiate humans from non-humans. In A. Broggi, M. Bertozzi, A. Fascioli and M. Sechi, "Shape-based Pedestrian Detection," *Proc. of IEEE Intelligent Vehicles Symposium*, pp. 215-220, October, 2000 (Broggi 2000), the disclosure of which is hereby incorporated by reference, objects are segmented from scenes using a combination of a stereo algorithm and constraints based on morphological characteristics. The extracted objects are then analyzed for strong vertical symmetry of the human shape for recognition.

SUMMARY OF THE INVENTION

A video detection apparatus and method is disclosed which may be adapted to detect and follow movement of a predefined object of interest within the video data of the output of a video camera encoded in frame-wise data, each frame occurring at sequential the intervals, and including the segmentation of at least one portion of the frame-wise data, an object segment, as potentially including the preselected object of interest, and including vertical edge pixels and horizontal edge pixels detected to be present within the object segment, and may comprise: an edge symmetry detection unit which may comprise: a vertical symmetry detector adapted to compute the vertical symmetry of at least one of the set of vertical edge pixels and the set of horizontal edge pixels in each column about a horizontal axis passing through the object segment, and to produce a vertical symmetry value for columns within the object segment; a horizontal symmetry detector adapted to compute the horizontal symmetry of at least one of the set of vertical edge pixels and set of horizontal edge pixels in each row about a vertical axis passing through the object segment, and to produce a horizontal symmetry value for rows within the object segment; and, an edge symmetry feature set computation apparatus adapted to compute an edge symmetry feature set for the object segment based upon the vertical symmetry values and the horizontal symmetry values; and, a background modeling unit which may comprise: a background modeling apparatus adapted to isolate from a current frame at least one segment of the current frame, each of the at least one segments containing a possible object of interest within the current frame, on a frame-wise basis, and to provide as an output each of the at least one segments; an object of interest classifying apparatus adapted to determine whether or not any segment of the at least one segments output from the background modeling apparatus includes a object of interest and to characterize any such segment as an object segment, utilizing at least in part the edge symmetry feature set; an object segment tracking apparatus adapted to track the location within the current frame of any object segment, and to determine a projected location of the object segment in a subsequent frame, and to provide the background modeling apparatus with the projected location in the subsequent frame of the object segment; and wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest. The method and apparatus may computing the vertical symmetry and the horizontal symmetry of the set of vertical edge pixels and the set of horizontal edge pixels. The object segment tracking apparatus may further comprise: a matching apparatus adapted to match the location of an object segment in the current frame to one of a plurality of projected locations of the object segment in the current frame, which projections are based upon the location of the respective object segment in at least one prior frame; and, a track provider adapted to receive and store the location of an object segment in the current frame and over a plurality of prior frames and adapted to provide the projections of the location of the object segment in a subsequent frame based upon the locations of the object segments in the current frame and the plurality of prior frames. The vertical symmetry detector may be adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and the horizontal symmetry detector may be adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis. The background modeling apparatus may be adapted to provide as its output the projected location of the object segment in the subsequent frame in order to override any conflict in the labeling of pixels in the subsequent frame as part of a segment containing a possible object of interest and the feature set computation apparatus may further comprise: a horizontal fuzzy set computation apparatus adapted to compute a fuzzy set value for each of a plurality of horizontal fuzzy sets each having a selected weighting function applicable to a selected group of columns within the object segment, with the columns grouped according to position along the horizontal axis in the object segment; and a vertical fuzzy set computation apparatus adapted to compute a fuzzy set value for each of a plurality of vertical fuzzy sets each having a selected weighting function applicable to a selected group of rows within the object segment, with the rows grouped according to position along the vertical axis in the object segment. The background modeling apparatus may be adapted to isolate from a current frame the at least one segment of the current frame utilizing the video object plane extracted from the current frame, and the horizontal fuzzy sets may further comprise: a left extreme fuzzy set having a weighting function that is a constant value for a first selected number of columns from the left border of the object segment toward the vertical axis of the object segment and decreases to zero over a second selected number of columns toward the vertical axis if the object segment; and, a right extreme fuzzy set having a weighting function that is a constant value for a third selected number of columns from the right border of the object segment toward the vertical axis of the object segment and decreases to zero over a fourth selected number of columns toward the vertical axis of the object segment; and at least one horizontal internal fuzzy set having a weighting function that increases from zero to a peak value and decreases to zero as the columns contained in each such internal fuzzy set go from left to right across the object image; and, the vertical fuzzy sets may further comprise: a bottom extreme fuzzy set having a weighting function that is a constant value for a fifth selected number of rows from the bottom border of the object segment toward the horizontal axis of the object segment and decreases to zero over a sixth selected number of rows toward the horizontal axis if the object segment; a top extreme fuzzy set having a weighting function that is a constant value for a seventh selected number of columns from the top border of the object segment toward the horizontal axis of the object segment and decreases to zero over an eighth selected number of rows toward the horizontal axis of the object segment; and, at least one vertical internal fuzzy set having a weighting function that increases from zero to a peak value and decreases to zero as the rows contained in each such vertical internal fuzzy set go from bottom to top across the object image. The at least one segment of the current frame may comprise a bounding box, and the columns associated with each of the horizontal fuzzy sets may be overlapping into respective adjacent horizontal fuzzy sets; and, the rows associated with each of the vertical fuzzy sets may be overlapping into respective adjacent vertical fuzzy sets. The feature set computation apparatus may further comprise a fuzzy set edge value score computing apparatus adapted to compute a fuzzy set edge value based upon the respective horizontal edge value or vertical edge value for the respective column or row and the respective horizontal fuzzy set weighting function value for the respective column or the respective vertical fuzzy set weighting function for the respective row.

DETAILED DESCRIPTION OF THE PREFERRED EMBODIMENT

Figure 1:
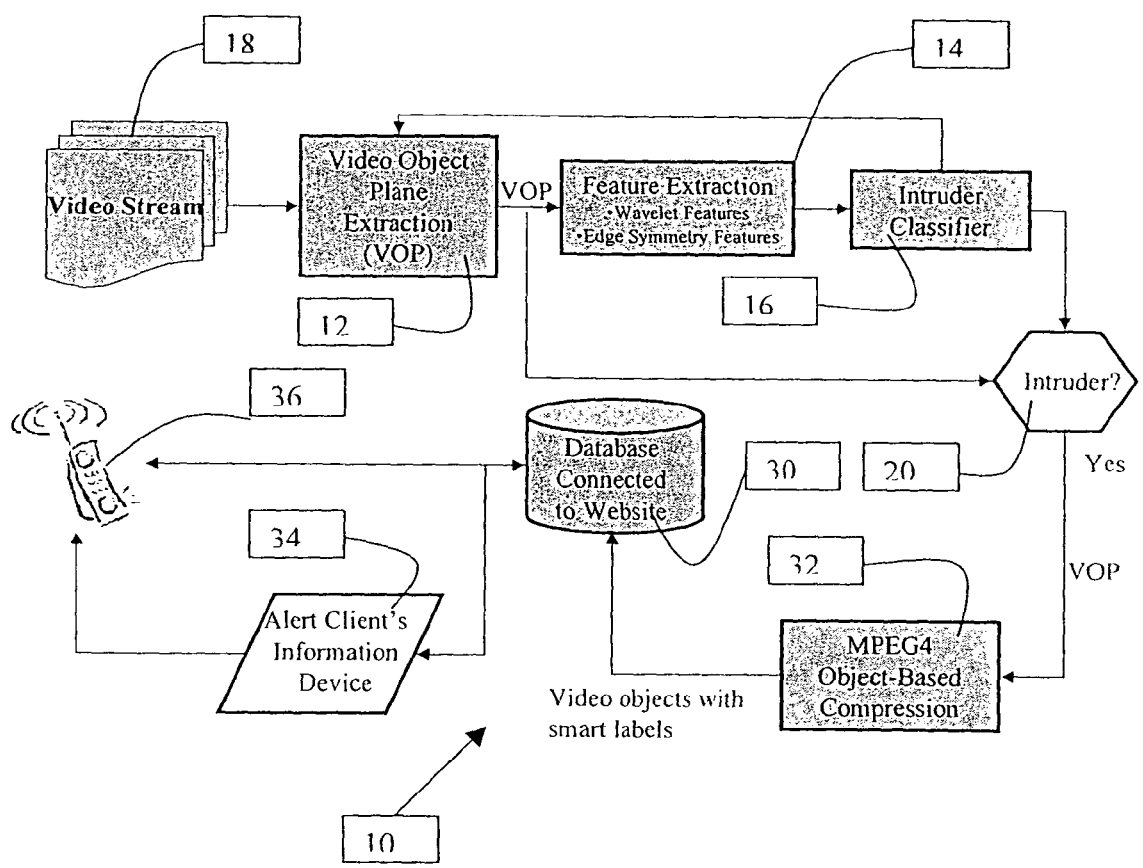
FIG. 1 shows a high-level block diagram of an embodiment of the present invention.

The present invention relates to an application-specific object-based segmentation and recognition technology. The present invention is designed for a number of applications, including the presently preferred embodiment disclosed herein, i.e., a home/business video-based security and monitoring market. A high-level block diagram of an embodiment of the present invention is shown in FIG. 1. This embodiment of the present invention can combine object segmentation, e.g., for the MPEG-4 video compression standard, specialized recognition algorithms, e.g., for detecting objects of interest, e.g., an intruder in the video scene, moving at least sometimes, through portions of the video scene, which can operate on the segmented objects. The output of the system can be stored, e.g., in a video database/server for use, e.g., for notifying users when suspicious activity has been detected to have occurred and supplying the user, e.g., with streaming video of the activity. The objects in the video can be labeled with tags, allowing the user to verify the detection decision. This system can combine high video compression levels with computer vision recognition, making possible new video-based security applications over low-bandwidth connections.

A system 10 according to an embodiment of the present invention may consist of three main modules, e.g., background modeling and object segmentation, e.g., in a Video Object Plane ("VOP") Extraction module, feature extraction, e.g., in a Feature Extraction module 14, which may utilize, e.g., wavelet features and edge features, e.g., edge symmetry features, and an Intruder Classification module 16. The input image of a scene, e.g., the Video Stream 18 of, e.g., frames of video in the video stream 10 can be captured, e.g., by a fixed camera (not shown) or by a camera (not shown) with quasi-static motion. The image in the video stream 18 can first be processed to identify any candidate object(s) in the scene within the video object plane extraction module 12. This can be achieved, e.g., by using a background modeling module that is capable of adapting to variations in the scene such as changing illumination and change in the scene.

The candidate objects, as explained in more detail below, can then be filtered by, e.g., object segmentation, in, e.g., the VOP extraction module 12, using, e.g., constraints, e.g., shape and size constraints, to obtain a refined list of candidate objects. Sets of features, e.g., a set of three features—wavelet, edge-symmetry and template matching, may then be extracted from the refined list of candidate objects by the feature extraction module 14. Training data for each feature type can be used to train a separate intruder classifier for each candidate object. The individual classifier outputs can then be fused by a fusion classifier in the intruder classifier module 16 to provide a final output decision on detected object(s). The fusion classifier, as discussed in more detail below, can also be used to help in balancing the strengths and weaknesses of each individual classifier to provide a robust intruder classification approach.

To further improve system robustness and accuracy, this embodiment of the present invention may have an object tracking module represented by the feedback from module 16 to module 12 that can be utilized for assisting in stabilizing the classification, e.g., by matching and tracking objects of interest, e.g., intruders, e.g., from frame-to-frame. This, at least in part, can enable a system according to an embodiment of the present invention to deal much more effectively with such possibly detrimental occurrences as, e.g., partial occlusions, momentary fluctuations in the classification results due to flicker in lighting, and the like. It can also be used, e.g., to improve the performance of the background model.

A more detailed flowchart of the present embodiment of the invention can be found in FIG. 2, as discussed in more detail below. An object-based video dynamic database and server 30 can also be constructed for utilization along with the invention as described in this application.

The present preferred embodiment of the present invention can utilize a background modeling scheme in the video object plane extraction module 12 that is an improvement upon the proposals of Wren et. al, 1997 and can employ an adaptive statistical model that can be pixel-based. The disclosed preferred embodiment of the present invention can, e.g., model the incoming image frames from the video stream 18 as, e.g., as a fixed or slowly changing background locally occluded by objects. The model can be used, e.g., in a dynamic fashion to determine, e.g., (in each frame) the set(s) of pixels that belong to the background and the set(s) that belong, e.g., respectively to the occluded regions/objects, e.g., for every image. In the model according to an embodiment of the present invention, each background pixel can be modeled, e.g., as a one-dimensional Gaussian distribution in gray-level intensity. When a new image frame is processed, the value of the observed intensity at each pixel can be compared with the current Gaussian distribution, e.g., for each given pixel. This comparison can then be used to decide whether the given pixel must belong to the background or to an occluded region. Occluded pixels can be grouped into regions and if the grouped region is small in size, then it can be filtered out and the corresponding pixels can then be labeled as background pixels. The distribution for each background pixel can then be updated based on, e.g., the latest input image or observation, e.g., to account for changes in the scene background.

Denoting the image at time instant k by $I_k$ and the intensity at any given pixel (i, j) for that time instant by $I_k(i, j)$, two other terms can be defined as the difference image $D_k$ that is computed as the difference between the images $I_k$ and $I_{k-1}$; and the perceived difference image $P_k$ that is computed as the difference between $I_k$ and $B_k$. $B_k$ is the background model at time k. Each background pixel (i, j) can be modeled, e.g., by a Gaussian distribution, characterized by its mean value $\mu(i, j)$ and its standard deviation $\sigma(i, j)$. For the very first frame, the background model can be initialized such that the mean value is the intensity of each pixel in the input image and the standard deviation is set to a minimum value $\sigma_{min}$. For all the other input frames, each observation or image pixel intensity can be compared with the background pixel values by computing $P_k$. If $P_k(i, j)$ is less than $2*\sigma(i, j)$, then the pixel is labeled as a background pixel. Otherwise it can be labeled as an occluding pixel, i.e., a foreground pixel, which can be considered as a pixel in a possible object of interest. Thus, the input image can be converted into a binary image of background pixels and foreground pixels. The occluding/foreground pixels can be grouped into regions and then filtered out if the region is too small compared to the expected range in size of objects of interest. The filtered pixels can then also be labeled as background pixels. The statistical model for each background pixel can then be updated as shown in equation (1) below:

$$\mu_k(i,j)=(1-\alpha)\mu_{k-1}(i,j)+\alpha I_k(i,j)$$

$$\sigma_k^2(i,j)=\max\{\sigma_{min}^2,(1-\alpha)\sigma_{k-1}^2(i,j)+\alpha(I_k(i,j)-\mu_k(i,j))^2\}$$

where $\alpha$ is the forgetting factor. This parameter can be set by the user and essentially weights the prior background model with respect to the current observation. Higher values of $\alpha$ imply forgetting the old background model at a rapid rate and lower values indicate the desire to retain the prior background model for a longer time. This parameter can be set, e.g., at the low value of 0.025) initially. This assumes that the background obeys a slowly-varying or quasi-static background model.

As long as the number of occluding pixels $N_k$ in any given image as extracted using the background model is small (i.e., only a few occluding objects), the quasi-static setting as described above works very well. An exception to this model can occur for low $N_k$. This exception could correspond to a situation where an occluding object that was moving along in the image comes to a stop momentarily and then continues to move. When the object comes to a stop for a few frames, the background model can be affected because the statistics for the object pixels remain unchanged for those frames. This could be interpreted as a background pixel since the deviation could be within $2*\sigma(i, j)$ for that pixel. This can create a problem when the object of interest resumes its movement. In that case, the newly uncovered portion of the background of the image as well as the newly occluded portions of the image (by the same object) could then be interpreted by the model as occluding regions. To circumvent this problem, an embodiment of the present invention can make use of the $D_k$ and $P_k$ images. In the above situation, the $D_k$ image will not register the pixels corresponding to the uncovered portions of the background after a relatively small number of frames. Thus, for some pixels in the image, the occluding pixels in the $D_k$ and $P_k$ images will not match after the small number of frames. In this event, the pixels that do not register as occluding pixels in the $D_k$ image can be immediately re-labeled as background pixels. This check can be performed for every frame in order to enable the model to address this exception.

Figure 3:
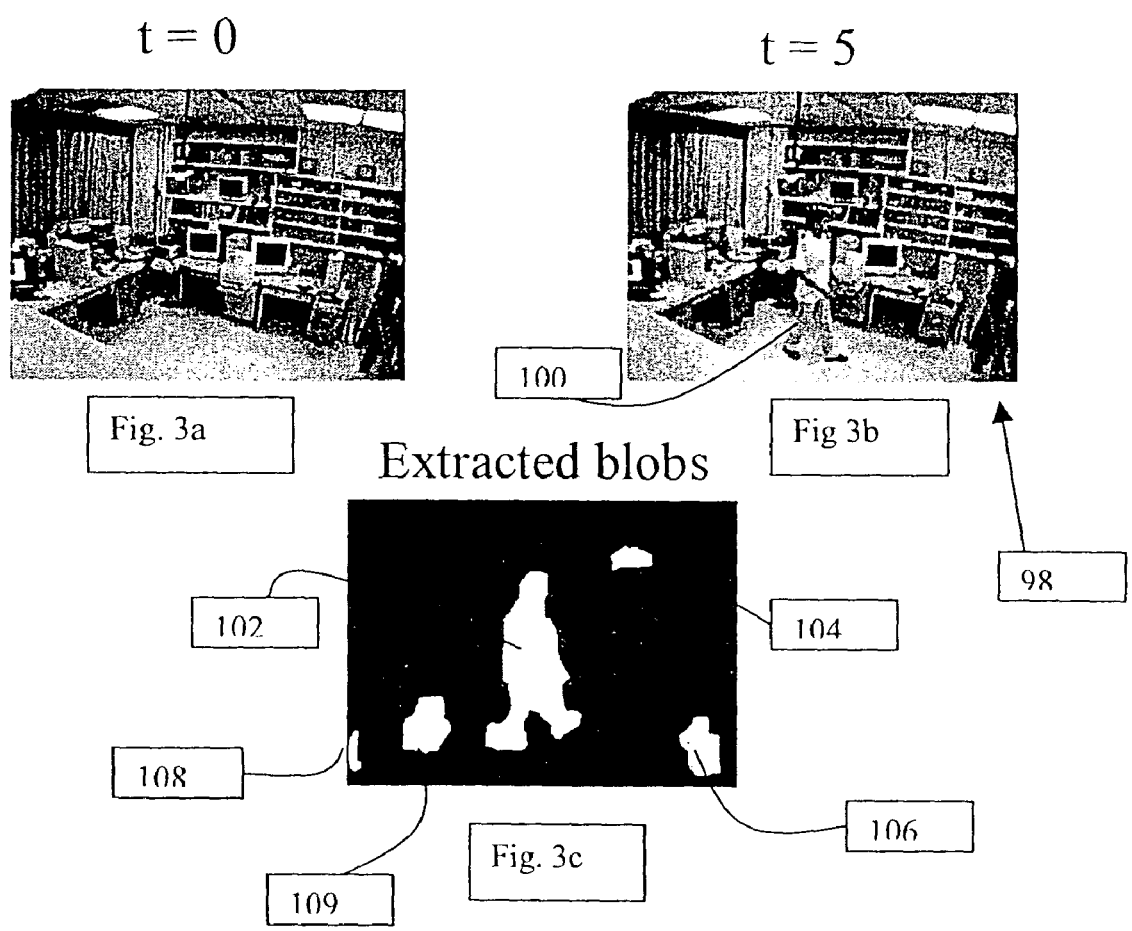
FIGS. 3a, 3b and 3c show an example of the formation of a binary image extracted from a sample image according to an embodiment of the present invention; and, FIGS. 4a, 4b, 4c and 4d show an example of intermediate steps in the foreground object video object plane extraction process according to an embodiment of the present invention.

The other exceptions that can occur can correspond to either a drastic change in illumination; a drastic change in the environment/scene content; or motion of the camera. In all these situations, a common result can be that $N_k$ exceptions can be recognized when $N_k$ is above some threshold, e.g., 40% of the total number of pixels in the image. In this event, the forgetting factor $\alpha$ can be set very high, e.g., to 1.0. This setting can essentially re-initialize the background model such that the mean and variance of the individual pixels are reset as if building the background model from scratch. This can allow the background model to be flexible and yet robust in modeling the background under a variety of situations for a fixed camera or a camera with quasi-static motion such as a surveillance camera with a pan unit. An example binary image extracted for a sample image is shown in FIGS. 3a, 3b and 3c where the white blobs correspond to occluding pixels and the black pixels correspond to the background pixels. In FIG. 3a, there is no object of interest in the frame at, e.g., time t=0. Therefore, the background model has stabilized with the statistics for essentially all of the pixels in the frame at time t=0 being considered background. In FIG. 3b, an object of interest, e.g., an intruder 100, has entered the frame at time t=5. FIG. 3c indicates the pixels in the current frame at, e.g., t=5 that are considered as belonging to a possible object of interest, grouped together into extracted blobs 102, 104, 106, 108, and 109 of some threshold size due to the fact that they also are more than two standard deviations from their background model values. The smaller blobs, e.g., can result from some change in the shadow or lighting due to the presence of the object of interest, e.g., blocking a light source causing a shadow to fall in the image of the frame at time t=5 or reflection off of the object of interest, or the like.

The background model may also receive feedback, e.g., from the intruder classification module 16 regarding the final region that corresponds to, e.g., an object of interest, e.g., an intruder in the current frame. This information (which may also include feedback derived from the object tracking module 82) may be used to override any conflicts in the labeling of the pixels in terms of background and occluding pixels. This can help the system according to this embodiment of the present invention to dynamically update the background model far and beyond simply using statistics from each frame.

Once the background and occluding pixels in the video data of an image, e.g., in one frame have been reliably ascertained, the occluding/foreground (i.e., non-background) pixels must be associated with, i.e., made to correspond to the foreground objects in the scene or image. This task can be anything but trivial due to a number of reasons. In the first instance, e.g., due to similarities in the intensities between foreground and background objects, all of the occluding pixels corresponding to a foreground object (potential object of interest) may not be connected. Also, the system, apriori, cannot know the number of foreground objects in the scene comprising the image. Occluding pixels found in the previous step can be associated with a corresponding foreground object which comprises at this stage a potential object of interest in the image. As described below, heuristics along with camera and geometrical constraints can be utilized, e.g., to find the number of objects and, e.g., their bounding boxes. The resultingly identified foreground objects can then be used as an extracted video object plane ("VOP"), e.g., for object-based compression schemes as, e.g., in MPEG4. The VOP objects can also be classified as an object of interest or non-object of interest, e.g., as an intruder or non-intruder type of object, using, e.g., the classifier 16, e.g., as is discussed in more detail below.

The occluding pixels in box 56, obtained from either or both of the background subtraction step in box 54 or the motion compensation step in box 55, as discussed above, correspond to pixels that were part of both moving regions as well as foreground object regions, i.e., they are non-background regions. A median filtering step in box 58 can be performed, e.g., using a 5×5 filter, e.g., as a first step to eliminate, e.g., small foreground regions, e.g., 104, 108 shown in FIG. 3. Once the small foreground regions, e.g., 104, 108, that may stein from slight illumination changes or the like, as discussed above, are eliminated, an embodiment of the present invention may connect foreground regions that are fragments of the same foreground object, potentially an object of interest. Depending upon the type of object of interest being sought to be detected there may be certain characteristics of the expected object image that can be utilized to help connect initially different foreground regions that are part of the same foreground object. For example, since intruders generally have stronger vertical edges, e.g., a morphological dilation step in box 60 may be performed, e.g., using a 7×1 vertical structuring element, which can help in connecting the different foreground regions that belong to the same object.

One of the goals of a VOP extraction module 12 as in the described embodiment of the present invention may be to essentially generate a mask for each foreground object, e.g., 102, 106 and 109 in the scene 98. After the just described dilation step, there might still remain holes in the foreground region corresponding to an object. Another dilation operation also in box 60 may be performed, e.g., using a 5×5 square structuring element, followed also in box 60 by an erosion step, e.g., with a 5×5 circular disk, and finally, also in box 60, with another erosion step, e.g., using a 5×5 square structuring element. All of these operations performed in box 60 on the foreground regions may, e.g., be employed sequentially. The above mentioned morphological operations may be employed to provide in block 62 robust, accurate foreground blobs, e.g., 102, 106 and 109 and eliminate, e.g., the effects of, e.g., such things as shadows cast by objects and the like, as discussed above.

Figure 4:
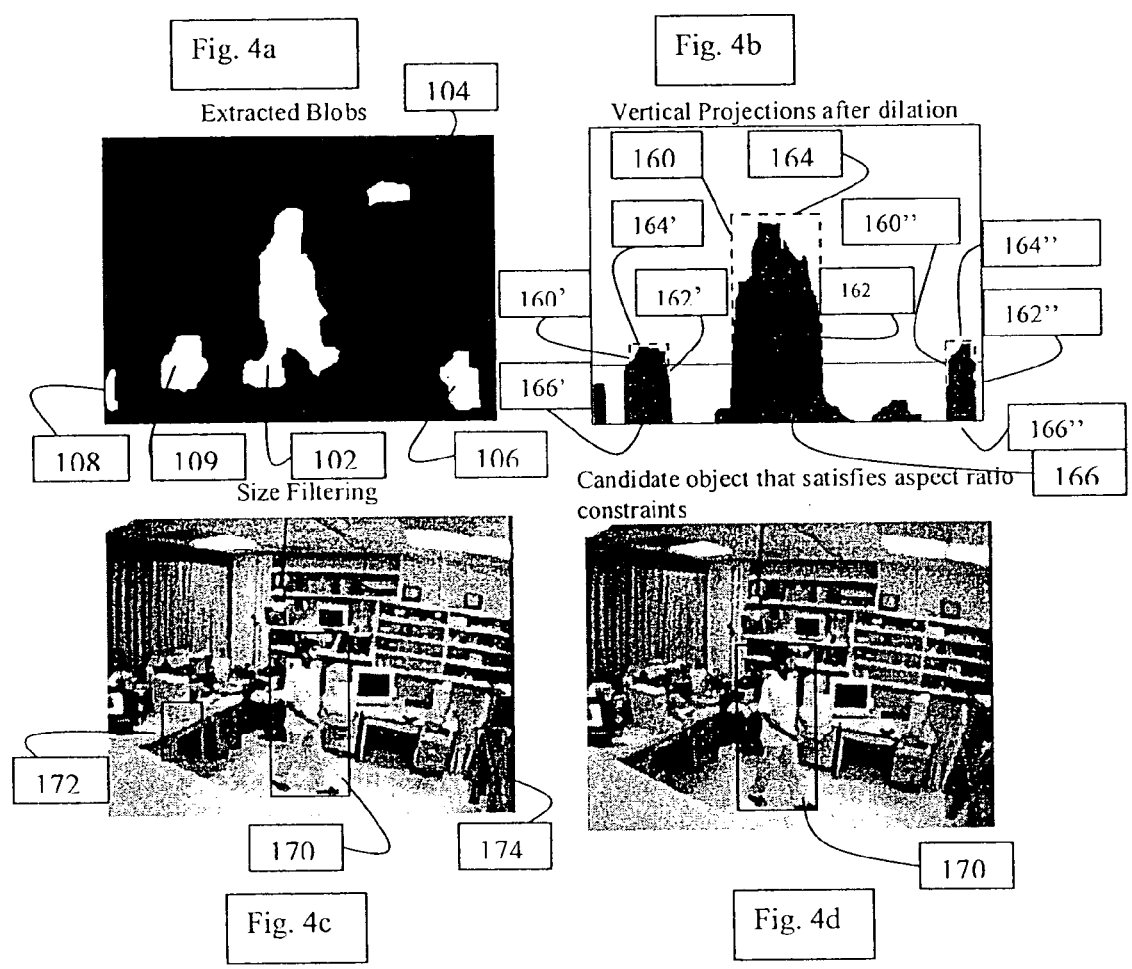

The disclosed embodiment of the present invention next may use, e.g., predefined constraints on the object of interest being sought to be identified, e.g., the geometrical constraints on the typical intruder/non-intruder type objects, to find the number of objects of interest in the scene represented by a given frame. To accomplish this task, e.g., a vertical profile of the binary foreground regions can be generated in block 64. A heuristic threshold can be employed to find all the foreground regions that have, e.g., at least a pre-defined minimum vertical extent. A minimum width constraint, e.g., of 25 pixels can also be used to ensure, e.g., that foreground regions that are very narrow will be rejected. The remaining foreground regions may then be filtered again in block 66 by, e.g., being subjected to a horizontal run-length filter. This process can help in eliminating shadows and small regions in the proximity of a foreground object. A bounding box of each of the remaining foreground objects can then be ascertained in block 68, e.g., by computing the minimum and maximum extents in the horizontal and vertical directions. Block 70 filters out remaining foreground blobs that do not satisfy bounding box aspect ratio constraints. In FIGS. 4a, 4b, 4c and 4d, there is shown the different intermediate steps in the exemplary foreground object (VOP) extraction process discussed above. FIG. 4a shows the same extracted blobs as in FIG. 3c. FIG. 4b shows the results of the vertical projections in block 64. FIG. 4c shows the results of size filtering in block 66 and FIG. 4d shows the results of the aspect ratio filtering in block 70.

In the disclosed embodiment of the present invention, a hybrid approach to human recognition can be employed in the feature extraction block 14 that can use, e.g., background modeling and motion information to first extract potential objects of interest from the scene. These potential objects of interest can then be analyzed, e.g., by adopting three different methods to recognize, e.g., humans. The first method can extract shape characteristics, e.g., by filtering edges extracted from the objects based on symmetry in block 86. A set of fuzzy features can then be extracted from the residual symmetric edges in block 88 and then fed to the classifier 16 (block 90) that can be adapted to learn to differentiate between objects of interest and objects of non-interest, e.g., between humans objects and non-human objects. A second method executed in block 14 may use a multi-scale Haar wavelet (similar to (Papageorgiou et al. 1998)) to extract features from the segmented objects. These features can then be fed to the classifier 16 that can be adapted to learn to recognize, e.g., humans. A third approach can be based on template matching executed in blocks 14 and 16, e.g., by using Hausdorf distance, as suggested in D. P. Huttenlocher, G. Klanderman and W. Rucklidge, "Comparing Images Using the Hausdorf Distance," *IEEE Transactions on Pattern Analysis and Machine Intelligence*, Vol. 15, no. 9, pp. 850-863, September, 1993 (Huttenlocher et al. 1993), the disclosure of which is hereby incorporated by reference. In this approach a human outline or template is constructed and then, using e.g., the Hausdorf distance metric, the best match of the template in the edge map can be identified. The matching score can be thresholded to classify the objects into objects of interest and objects of non-interest, e.g., humans and non-humans.

Figure 2:
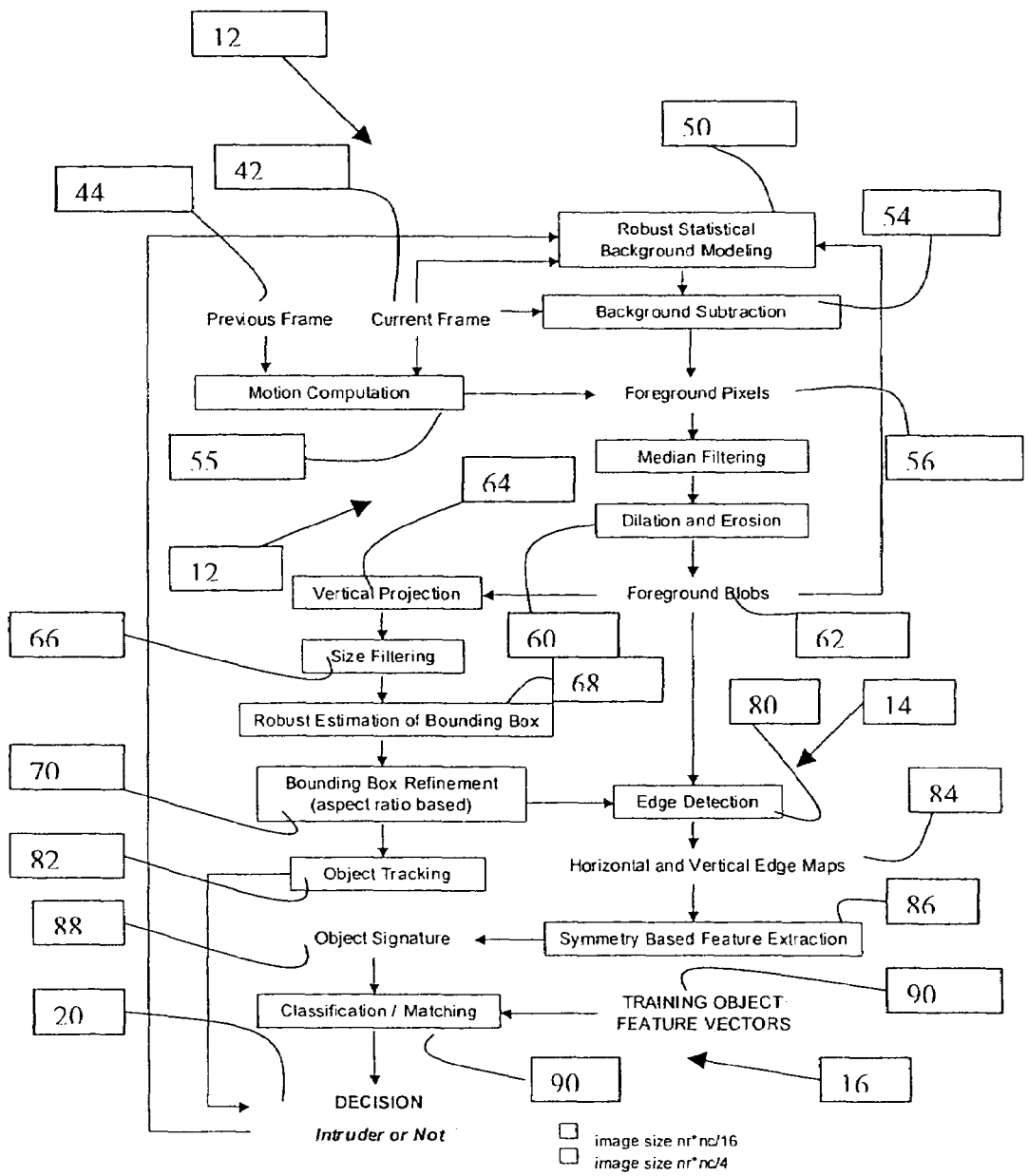
FIG. 2 shows a more detailed flowchart of the present embodiment of the invention.
Figure 7:
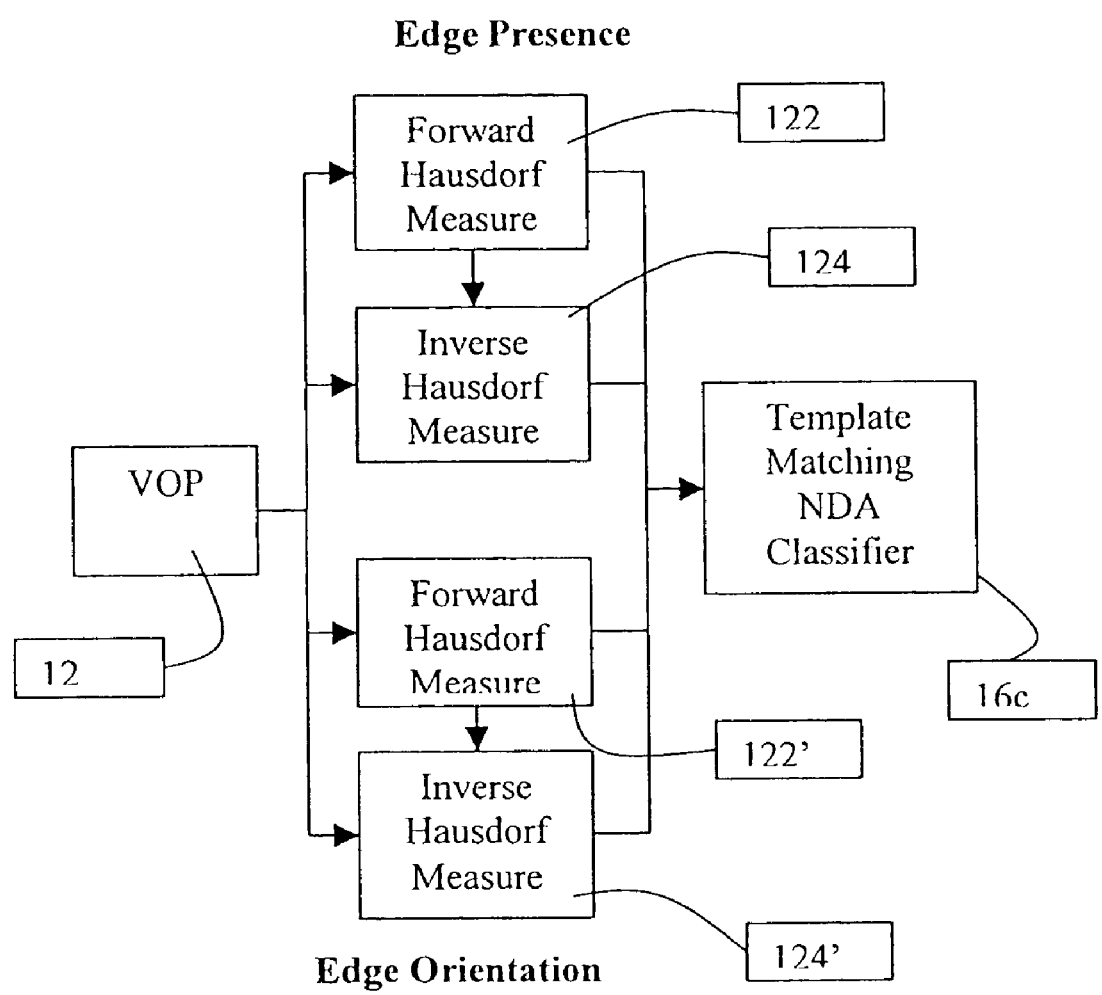
FIG. 7 illustrates a block diagram of a classifier system for extracting image information according to an embodiment of the present invention.

As is illustrated in FIG. 2, several feature set definitions, created, e.g., through template matching, e.g., Hausdorf template matching in block 16b, as illustrated more particularly in regard to FIG. 7, and, e.g., wavelet feature extraction in block 16c can be utilized, along with the symmetry based feature extraction, e.g., from block 86, e.g., to provide inputs for the creation of, e.g., an object signature in block 88. The object signature output of block 88 can then be utilized, e.g., for classification matching in block 90. Also shown in FIG. 2 is the edge detection, e.g., as provided in block 80 providing an input to the Hausdorf template matching in block 16b and, e.g., the foreground blob from block 62 providing an input to the wavelet feature extraction in block 16c.

In order to make the embodiment of the present invention more robust, these three classifications can be combined utilizing a novel fusion classifier in block 90. The recognition results of the fusion classifier in block 90 are more robust compared to any individual classifier. This is because each individual classifier has advantages and limitations in recognizing, e.g., humans due to the nature of features extracted. For example, the edge symmetry approach is good, e.g., for detection of upright humans without any occlusions and for small distortions. The wavelet classifier exhibit a similar performance but in some instances, e.g., is more robust in recognition due, e.g., to its multiscale representation. The template matching classifier can be more robust to occlusions and small distortions as well. By fusing the results of the three classifiers the present invention can be enabled to obtain a more robust classification of certain objects of interest, e.g., human intruders.

In the feature extraction process for each object(s) that is segmented into, e.g., a bounding box in, e.g., in block 70 based on the background modeling approach in the VOP module 12, as discussed above, first the horizontal ($h_e$) and vertical edges ($v_e$) can be extracted in block 80 from the object sub-image output of block 80 using, e.g., the Sobel operator, as suggested in R. C. Gonzalez and R. E. Woods, "Digital Image Processing," Addison Wesley, September, 1993 (Gonzalez 1993), the disclosure of which is hereby incorporated by reference. Conventional histogram equalization (Gonzalez 1993) can be used in block 80 to enhance the object sub-image before extracting these edges. This can help in acquiring more reliable edges (i.e., contrast information) under a wide range of illumination conditions. Once these edges are obtained, then the computation of the symmetry of the edges can be done in blocks 84 and 86.

As illustrated in FIGS. 5a, 5b, 5c, 5d, 5e, 5f, 5g, and 5h, two reference axes can be defined, comprising a horizontal axis passing through the center of the sub-image, e.g., contained in a bounding box 120, that bisects the sub-image into a top and bottom half; and a vertical axis 112 passing through the center of the sub-image in the bounding box 120 that bisects the sub-image into a left and right half. The symmetry of the horizontal and vertical edges can be computed using these defined axes 110, 1112.

Figure 5:
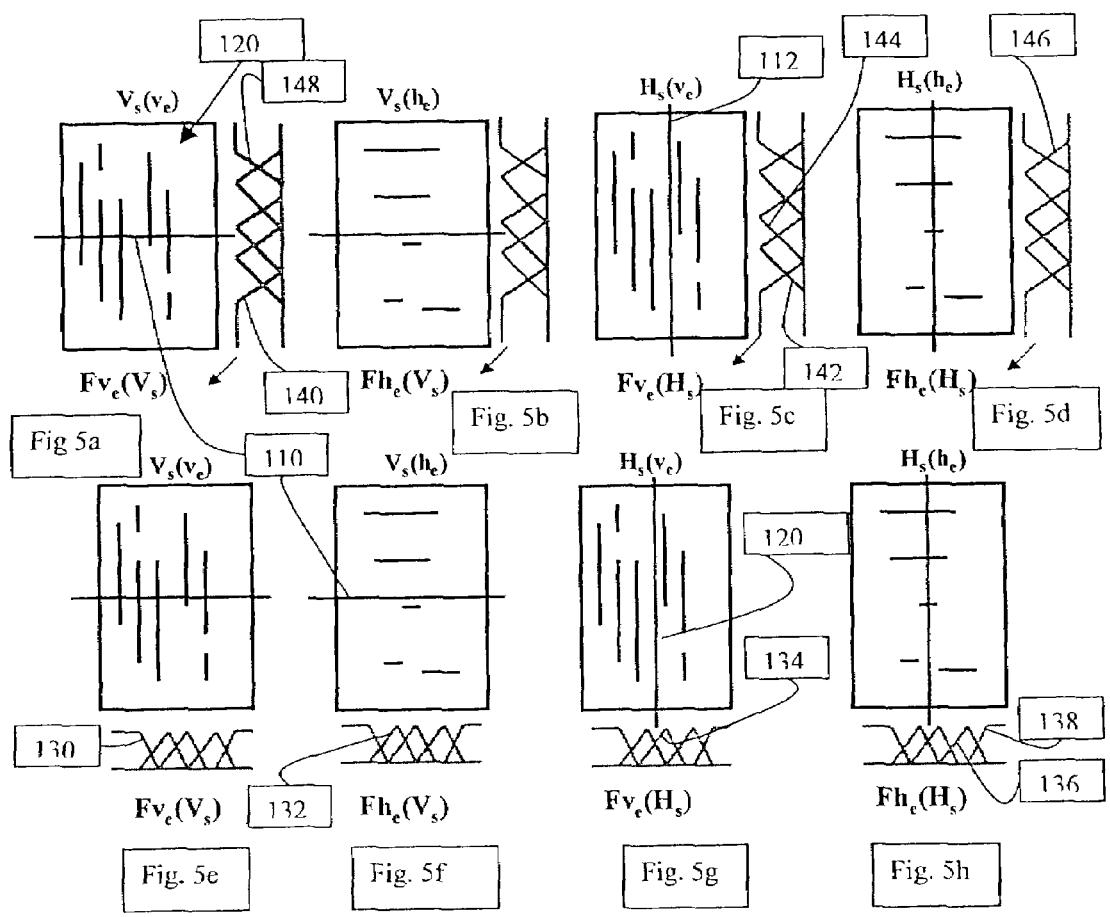
FIGS. 5a, 5b, 5c, 5d, 5e, 5f, 5g, and 5h illustrate a aspects of the computation of edge symmetry according to an embodiment of the present invention.

The symmetry of these edges can be computed for each row (or column) using a novel and simple symmetry operator. The symmetry of the vertical edges, e.g., about the horizontal axis 110 for any given column i of an object sub-image can be defined, e.g., as vertical symmetry $V_S^i$. This quantity can be computed using a fuzzy symmetry operator as:

$$V_S^i = \frac{N_T^i}{N_B^i} \text{ if } N_B^i > N_T^i \text{ \& } N_B^i \neq 0 \quad (2)$$

$$= \frac{N_B^i}{N_T^i} \text{ if } N_T^i > N_B^i \text{ \& } N_T^i \neq 0$$

$$= 1.0 \text{ if } N_T^i = N_B^i \text{ \& } N_B^i > 0 \text{ \& } N_T^i > 0$$

$$= 0.0 \text{ if } N_T^i \text{ OR } N_B^i = 0$$

where $N_T^i$ and $N_B^i$ represent the number of vertical edge pixels in the top and bottom half of the column (i). A similar expression can be defined for the vertical symmetry of horizontal edge pixels. This symmetry operator, e.g., as shown in FIGS. 5a and 5b, therefore, can measure the ratio between the number of vertical or horizontal edge pixels above and below the horizontal axis 110 of any given column, e.g., within the bounding box 120. The symmetry value is always between 0.0 and 1.0. In the same manner as equation (2), the operator $H_S^j$, e.g., as shown in FIGS. 5c and 5d, which measures the horizontal symmetry of vertical and horizontal edges for every row j in the object sub-image 120, can be defined. By applying this operator on the horizontal edges extracted from the sub-image 120, we can compute a symmetry score $H_S^j(h_e)$ that can measure the horizontal symmetry of the horizontal edges for every row j in the sub-image 120. Similarly, we can compute symmetry scores for the vertical symmetry of the horizontal edges in each column i ($V_S^i(h_e)$), the horizontal symmetry of the vertical edges in each row j, ($H_S^j(v_e)$) and vertical symmetry of each of the vertical edges in each column i ($V_S^i(v_e)$). The horizontal and vertical edge maps of the object in the sub-image 120 can be filtered using these four symmetry scores. The edges corresponding to the appropriate columns (or rows) that result in a symmetry score above some selected minimum symmetry threshold β can be retained. All remaining edges can be filtered or removed. This filtering process results in a residual horizontal and vertical edge map that contains only highly_symmetric pixels (either about the horizontal or vertical axis), as illustrated in FIGS. 5 *a-h*.

Once the filtering is performed, e.g., a final set of features can be computed for the classifier 16, e.g., using the filtered edge maps, e.g., as follows. These features can be derived from the filtered edges, e.g., using fuzzy sets. In this embodiment of the invention, five fuzzy sets are defined, e.g., using trapezoidal and triangular membership functions as shown in FIGS. 5*a-h*. These sets can be defined so as to measure, e.g., the density of the symmetric edge maps at various positions along the horizontal direction as illustrated in FIGS. 5*e-h* or along the vertical direction as shown in FIGS. 5*a-d*. The memberships of the edges corresponding to the symmetric horizontal and vertical edge maps in these fuzzy sets can form a succinct and yet robust set of features.

The fuzzy sets along the horizontal direction are denoted by $F_h$, and are illustrated in FIGS. 5*e-h*. In this embodiment of the invention, the five selected member fuzzy sets of $F_h$ can be denoted as LE (for left extreme) 130, L (for left) 132, M (for middle) 134, R (for right) 136 and RE (for right extreme) 138. A trapezoidal membership function can be chosen, e.g., for the corner fuzzy sets (i.e., LE 130 and RE 138) and, e.g., triangular membership functions can be chosen for the three middle fuzzy sets (i.e., L 132, M 134 and R 136). Each of the fuzzy sets 132-138 can be discretized into a total of P values, which can correspond to the P columns in the object sub-image 120. Each column i can be given a membership value $\mu_F^i$ in each of the five fuzzy sets F. The membership function for the fuzzy set LE, e.g., can be computed as:

$$\mu_{LE}^i = 1.0 \text{ for } i \leq 8 \qquad (3)$$
$$= 2.0 - \frac{i}{8} \text{ for } 8 < i \leq 16$$
$$= 0.0 \text{ for } i > 16$$

This equation describes the trapezoidal shape for the fuzzy set LE as shown in FIGS. 5*e-h*. Here the membership values for any column with a number less than a certain selected value, e.g., less than 8, i.e. within 8 columns from the left hand edge of the image box 120 is 1.0. Between columns 8 and 16 the membership value for each succeeding column i, moving to the right as shown in FIGS. 5*e-h*, linearly falls to zero and remains at zero across the rest of the image box 120. It is The membership function for the next fuzzy set L 132 can be seen to be 0 up until about column 8 and linearly increasing to 1.0 up to, e.g., column 18 and then linearly decreasing back to 0 for columns 18-28 and remaining 0 thereafter. The third fuzzy set m 134 may have a membership function which is 0 up to about column 16 and then linearly increasing to 1.0 at about column 26 and then linearly decreasing back down to 0 at about column 36. The fourth fuzzy set 136 can then be formed with a membership function linearly increasing from 0 to 1.0 between about columns 26 and 36 and decreasing back to 0 between columns 36 and 46. The last fuzzy set RE 138 can be seen to have a value of 0 up to about column 36 and increasing to 1.0 at about column 46 and remaining at 1.0 for the remainder of the columns in the sub-image. Similarly the fuzzy sets along the vertical direction $F_V$ can be labeled as: BE (for bottom extreme) 140, B (for bottom) 142, M (for middle) 144, T (for top) 146 and TE (for top extreme) 148, and looking at them from the right hand sides of FIGS. 5*a-d* they correspond to generally to the fuzzy sets 130-138 along the horizontal direction and can constructed similarly, with the exception that the vertical dimension is longer in rows j than the sub image is wide in columns i. Each of these fuzzy sets for each of the FIGS. 5*a-d* can be discretized into a total of Q values corresponding to the Q rows in the object sub-image. Each row j has a membership value $\mu_F^j$ in each of the five fuzzy sets 140-148 and is based on the shape of the fuzzy sets 140-148, just as with the fuzzy sets 130-138 for each of the FIGS. 5*e-h*. Two different shapes for the membership functions can be used to differentiate row and column values depending upon position in the sub-image, e.g., the triangular membership function can be computed closer to the image center, where the bulk of the object edges exist, in order to provides a finer scale (more differentiation) of membership values compared to the corner fuzzy sets which can have a trapezoidal shape, in order to provide a coarser scale of membership values. This is because edges due to spurious boundary effects may exist and can be discounted by the corner fuzzy sets by providing equal weighting in the band of columns and rows at the boundaries of the sub-image (i.e., providing less differentiation). These particular fuzzy membership functions are only examples and other functions may be superior for different window shapes and objects.

An example of the filtered horizontal edges symmetric about the horizontal axis, i.e., the vertical symmetry $V_s$, is shown in FIG. 5*b* and denoted as $F_v h_e(V_s)$. Similarly the filtered edges can also be partitioned into: $F_h h_e(H_s)$ (FIG. 5*d*), $F_h v_e(V_s)$ (FIG. 5*f*) and $F_h v_e(H_s)$ (FIG. 5*g*) where $H_s$ represents symmetry about the vertical axis (or its horizontal symmetry). A weight $w^i_{FH}(X)$ for each column i, in each fuzzy set $F_H$, and for each filtered symmetric edge type X (where X can be $h_e(V_s)$, $v_e(H_s)$, $v_e(V_s)$ or $h_e(H_s)$) can be defined as:

$$w^i_{FH}(X) = M^i(X)/Q \qquad (4)$$

where $M^i(X)$ represents the number of edge pixels of type X in the $i^{th}$ column. By definition (4), $w_{FH}^j(X)$ is always guaranteed to be between 0 and 1. Similarly, a weight $z^j_{Fv}(X)$ for each row j, in each fuzzy set $F_V$ and edge type X can be defined as:

$$z^j_{Fv}(X) = N^j(X)/P \qquad (5)$$

where $N^j(X)$ represents the number of edge pixels of type X in the $j^{th}$ row. By definition (5), $z^j_{Fv}(X)$ is also always guaranteed to be between 0 and 1.

The features for use, e.g., in a classifier 16, e.g., an edge symmetry classifier can be computed, e.g., by using these weights and the membership values for each fuzzy set along the horizontal or vertical direction (as the case may be). By way of example according to the disclosed preferred embodiment of the present invention $\Pi_{FH}(X)$ can be defined as the feature set for each fuzzy set $F_H$ and for each edge type X (as defined above) computed along the horizontal direction. This feature set can consist of a total of twenty features (five fuzzy set features for each of the four edge types defined by X) and can be computed as:

$$\Pi_{F_H}(X) = \frac{\sum_i w^i_{F_H}(X) * \mu^i_{F_H}}{\sum_i \mu^i_{F_H}} \quad (6)$$

In a similar fashion, feature set $\Pi_{F_v}(X)$ can be defined for each fuzzy set and each edge type X computed along the vertical direction as:

$$\Pi_{F_v}(X) = \frac{\sum_j w^j_{F_v}(X) * \gamma^j_{F_v}}{\sum_j \gamma^j_{F_v}} \quad (7)$$

These feature sets in equations 6 and 7 essentially represent the centroid of symmetric edge pixels for each position in the horizontal or vertical directions. This can result in extracting the final feature set as $\{\Pi_{F_H}(X), \Pi_{F_v}(X)\}$ that can include a total of, e.g., 40 features. These features can be trained using, e.g., a classifier as described below. The entire set of edge symmetry features, utilized in the described preferred embodiment of the present invention, are illustrated in FIGS. 5a-h.

The symmetry based feature extraction approach in the invention is related to the approach developed by Broggi et al. The present invention can use motion and aspect ratio constraints to localize potential positions of objects of interest, e.g., potential intruder positions, while the approach in Broggi et al. uses a stereo image for localization. Only vertical edge symmetry maps are computed in the Broggi approach. Furthermore, the symmetry is computed based on the distance from the axis placed at every horizontal position of the image. In the present invention, e.g., symmetry can be computed using both the horizontal and vertical edge maps, resulting in, e.g., a novel set of 40 fuzzy edge symmetry features that can be based, e.g., on computing the density of both the horizontally and vertically symmetric edges. The present invention also utilizes, e.g., a symmetry operator that can be based on computing the ratio of edge density about both the horizontal and vertical axes. Furthermore, e.g., the symmetry can be computed within windows that potentially contain objects of interest, e.g., intruders. Image entropy may also be used to filter symmetrical edges with highly uniform areas around it to obtain potential edge candidates.

The present invention, e.g., may also employ a new approach to wavelet-based detection of objects of interest, e.g., intruder detection. The present invention is an improvement upon the work of Papagerorgio et al. 1998 and is capable of learning the template feature set of an object of interest, e.g., the intruder template feature set, from training images. The relevant features can then be used, e.g., to train a classifier that can accurately predict the object of interest/non-object of interest class of the object, e.g., the intruder/non-intruder class of the object. This approach can work well because, learning the general characteristics of the problem from the examples, can obviate the need for explicitly handcrafting a solution.

A set of labeled training data from the object of interest class, e.g., the intruder class can be used to learn an implicit model for objects of interest, e.g., intruders. The images of the objects of interest, e.g., intruder images, used for training can be transformed into useable features, e.g., by being transformed from image space to wavelet space and can then be used to train a classifier. For a given image, the wavelet transform can compute the response of, e.g., wavelet filters over the image. The wavelet filters can have multiple orientations, e.g., each of three oriented wavelets, vertical, horizontal, and diagonal, which can also be computed at different scales, e.g., two different scales (32×32 and 16×16). The multi-scale approach can allow the system to represent coarse scale features as well as fine scale features. An over-complete representation can be utilized to correspond to a redundant basis wavelet representation and can give better spatial resolution. This can be accomplished by shifting wavelet templates, e.g., by ¼ the size of the template instead of, e.g., shifting by the size of the template. By utilizing the absolute value of the wavelet coefficients, differences in features when considering dark object on a white background versus opposite contrast scenarios can be reduced or eliminated. A histogram equalization step can be utilized to ensure that all objects of interest, e.g., intruder images, have similar brightness levels.

The VOP object extracted in the VOP extraction module 12 is available for potential classification as an object of interest, e.g., an intruder or non-intruder object. For this purpose, the present invention can first extract the image region surrounding the VOP object in bounding box refinement block 70, e.g., by selecting an image region such that a selected aspect ratio is maintained, e.g., an aspect ration of 2:1. This object region can, e.g., then be scaled, e.g., into an image region of size 128×64, also in block 70. Haar wavelets, e.g., at the above-mentioned 2 scales and 3 orientations can then be used, e.g., to generate 13×5 vertical, horizontal, and diagonal coefficients at 32×32 scale and 29×13 vertical, horizontal, and diagonal coefficients at 16×16 scale. Using, e.g., first order statistics, the described embodiment of the present invention can then, e.g., generate average wavelet coefficient images at the 2 scales and 3 orientations that can correspond to objects of interest, e.g., intruder objects. From these templates, e.g., the described embodiment of the present invention can determine the wavelet coefficients that contain enough information to discern the two classes of objects, e.g. using the Kullback information measure and/or manual selection. As an example, it has been experimentally shown by the applicants that a selected 180D wavelet feature vector can be used to train a classifier 16, e.g., a non-linear discriminant (NDA) neural network classifier. For a given test image, the selected wavelet coefficients can be extracted and fed to the classifier 16, as shown in FIG. 2, which can then predict the class for the input image. A block diagram of the wavelet features based classifier is shown in FIG. 6.

Figure 6:
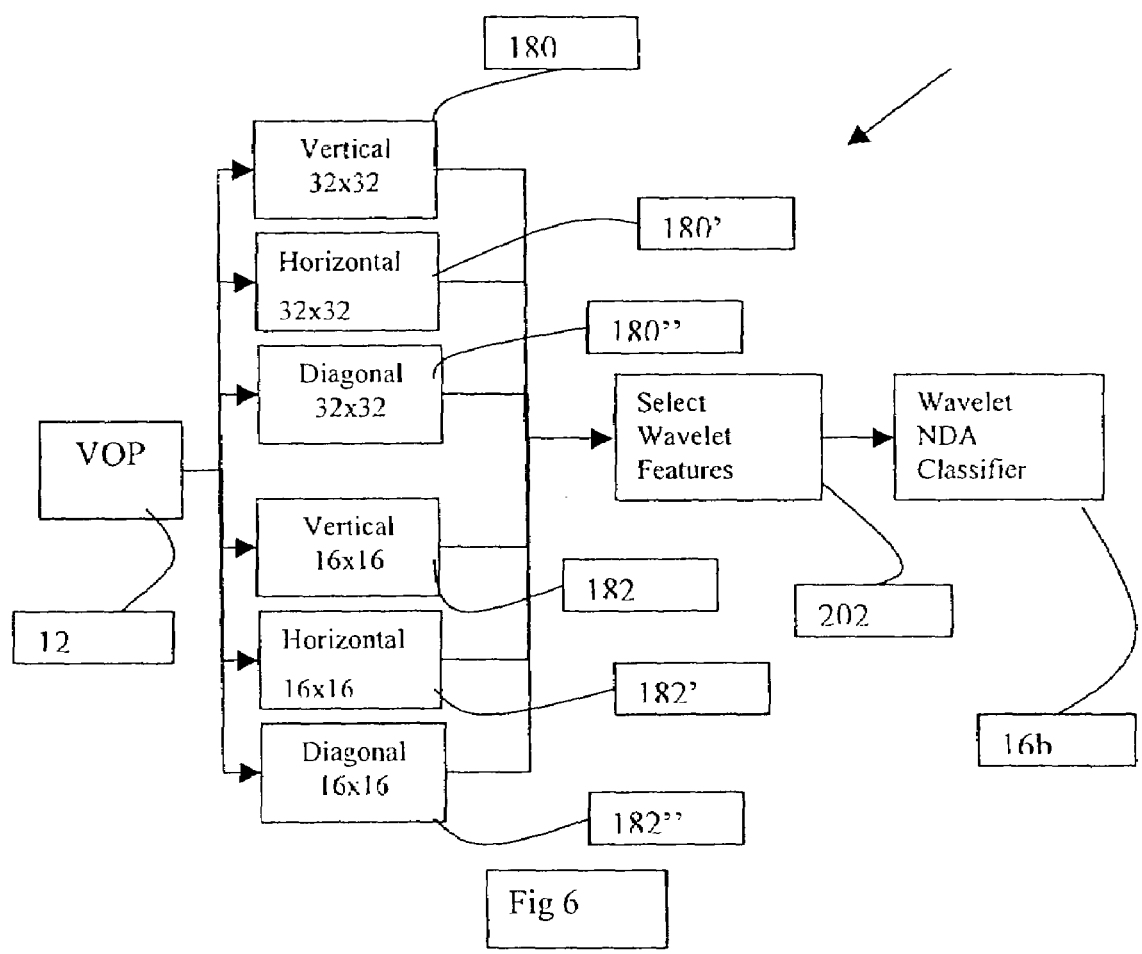
FIG. 6 shows a block diagram of a wavelet features based classifier according to an embodiment of the present invention.

As shown in FIG. 6, there are vertical 180, horizontal 180' and diagonal 32×32 pixel scale and vertical 182, horizontal 182' and diagonal 182" 16×16 pixel scale operators that can operate on the 128×64 scaled version of the VOP extracted in block 12 to provide selected wavelet features to block 202 which can then be provided to a wavelet NDA classifier 16b.

According to the disclosed embodiment of the present invention a third feature type, e.g., can be based on, e.g., shape information in the extracted foreground object. Specifically, according to the disclosed embodiment of the present invention a search can be conducted for a pre-defined template in an image, e.g., "human outline" template in the image, as is well known, for identifying patterns in images. In the literature, there exist both pixel-based and high-level features based approaches. A version of template matching is suggested in Huttenlocher et al 1993. The Hausdorf distance measure is a max-min distance measure and is often used to find the distance between two sets of points. This measure can be used in the disclosed embodiment of the present invention to find the similarity between a set of template points and a set of image points. The proposed approach according to the disclosed embodiment of the present invention is fast, easy to implement and is robust to slight variations in the object attributes and is illustrated in FIG. 7. The distance measure can also be used to find partially occurring matches.

For two sets A, B, the Hausdorf distance can be defined as $$H(A,B)=\max(h(A,B),h(B,A)) \quad (8)$$

where $$h(A, B) = \max_{a \in A} \min_{b \in B} \|a - b\|,$$

and the norm is the Minkowski norm. The function h(A,B) is the distance from set A to B. In Huttenlocher et al. 1993, the authors suggest that the Hausdrof distance measure can be easily computed using Voronoi diagrams or the distance transform of the image. In the approach of the disclosed embodiment of the present invention, mostly for ease of computation, a simple Euclidean distance transform can be used to find the Hausdorf measure.

A features template, e.g., a "head and shoulders" template may need to be robust to slight changes in size, shape, and orientation. This can be achieved, e.g., by generating affine transformed templates of a typical "head and shoulders" template. Each of the affine transformations can then be matched with the distance transform of the image and the best matching transformation score can be selected as the Hausdorf measure. To compute the inverse Hausdorf distance, it is possible to use the best forward match template and, e.g., select the corresponding region from the object image. The distance transform of the best-matched template and the image pixels from the selected region can then be used to find the inverse Hausdorf distance measure.

In order to increase the system efficiency, it is possible, e.g., to hierarchically organize the transformed templates and, e.g., only follow the sub-tree corresponding to the best matching transformation at a particular level. Also, for subsequent template matching of the same object according to the disclosed embodiment of the present invention, e.g., only the transformed templates that are similar to the previous best-matched template are used. This can reduce, e.g., the search space and, e.g., can increase efficiency. To further increase the robustness of the Hausdorf measure, as utilized in the disclosed embodiment of the present invention, the orientation of edges in the image and the template can be utilized. The orientation, e.g., of all edges from a test image and the template can be quantized into 5 possible angles (0, π/4, π/2, −π/2, −π/4). At each of the template points, e.g., the absolute difference between edge direction of the nearest image edge point and the template point can be computed. This measure can be accrued across all template points and, e.g., the value used to represent the degree to which the orientations of edges in a particular region match the orientation of the template edges.

The forward and inverse Hausdorf measures, e.g., using edge presence and the forward and inverse Hausdorf measures, e.g., using edge orientation can be compiled into a 4D feature vector. A template matching NDA classifier, e.g., can then be trained on the 4D data. For a given test image, the 4 feature values can be computed and fed to the NDA classifier, which can then predict the class of the input image.

Figure 8:
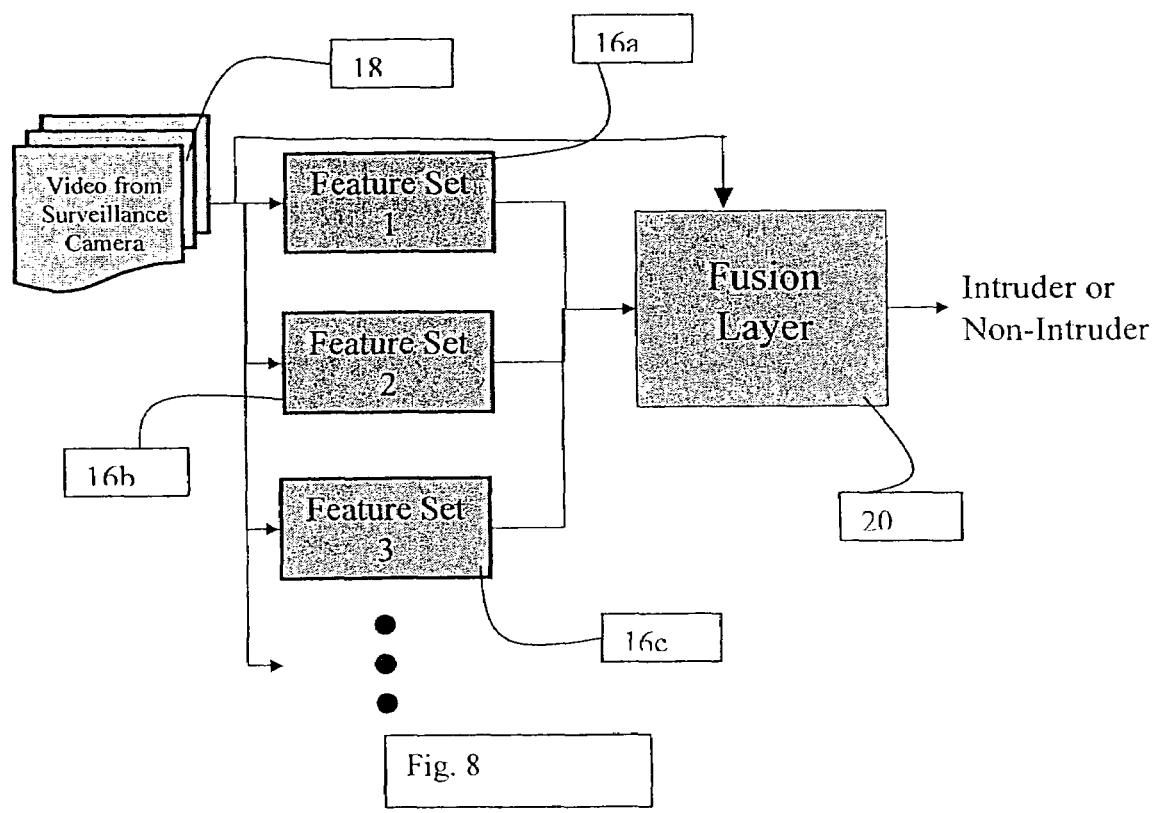
FIG. 8 shows an overall classifier architecture, e.g., for a fusion vision system, according to an embodiment of the present invention.

An overall classifier architecture, e.g., for a fusion vision system, according to an embodiment of the present invention, for recognition and tracking of objects of interest, e.g., intruders is shown in FIG. 8. A general approach according to an embodiment of the present invention can be to extract different types of information or "features" from the stream of images generated by a vision sensor. An advantage of using a vision sensor can be that the benefits of combining multiple features and classifiers can be realized using a single sensor because very different features can be generated from the same stream of images. Examples of visual features that could be utilized for classification include various moments of the segmented object, edge symmetry, and scale (wavelet transform). A subclassifier module can be created for each feature type, which can classify the object as an object of interest or non-object of interest, e.g., an intruder or non-intruder. Each subclassifier module can generate a class prediction and confidence value. The class prediction and confidence values of the subclassifiers can then be combined, e.g., in a fusion engine which, e.g., can make the final decision as to whether or not the object is an object of interest, e.g., an intruder. Both the subclassifiers and the fusion engine can be implemented according to the disclosed embodiment of the present invention as statistical classifiers, which, e.g., can be trained using examples of typical situations and objects of interest, e.g., intruders. (Examples of suitable statistical classification algorithms include neural networks, decision trees, support vector machines, k-nearest neighbor classifier, etc.) The subclassifiers can first be individually trained using the same training set images. The outputs of the trained subclassifiers for a new training data image set can then be used to train the fusion layer. By using a new training set, the fusion layer can be utilized, e.g., to see how the subclassifiers perform on new images they have not seen before. In this way the fusion layer can be utilized to "learn" how much weight to give to each of the subclassifiers. Because, e.g., the fusion engine can be utilized, e.g., to combine the "votes" of the subclassifiers in an optimized manner, the final decision accuracy can be made higher than can be achieved using any of the individual features and/or subclassifiers.

An object tracking module 82 according to the described preferred embodiment of the present invention can be designed to make a classification of an object of interest, e.g., an intruder, more robust. In order to make the classification decisions more robust, the tracking module 82 can, e.g., make use of the classification of objects of interest, e.g., intruders, from the previous frames to aid in the classification of current and future images/frames. This can prove to be very helpful for regulating the momentary misclassifications that can creep in due to reasons such as impulse changes in illumination due to flickers of light source and the like as noted above. Further, if the feature set extracted from the potential intruder blob, e.g., potential intruder blob 102, momentarily falls on a decision boundary of the fusion classifier due, e.g., to variation in the pose or orientation of the object of interest, e.g., the intruder, compared to those in the training data, the tracking module will stabilize the classification. Another benefit of the tracking module 82 can be to create the ability to recognize objects of interest, e.g., intruders, even in the presence of partial occlusions such as chairs etc. As mentioned above, it can also be used as a feedback mechanism to help in making rapid adjustments to the background model based on the tracked positions of objects of interest, e.g., intruders.

The processing steps for the tracking module 82 can be split, e.g., into three parts, e.g., track initialization, track propagation and track termination. The track initialization step can initiate video tracks for all objects of interest, e.g., intruder objects, alone. Each track can have, e.g., a buffer that can store, e.g., the corner points of, e.g., the bounding box of the object of interest, e.g., the intruder, as well as, e.g., the intensity, e.g., for all the pixels within that bounding box. A track confidence level at the initialized stage can be set low, e.g., to zero. The classifier decision from the classifier 16 can also be stored, e.g., in a buffer for each track. Once the video tracks are initialized, they can then be propagated, e.g., into successive frames, e.g., using a track propagation step. The track propagation step can be utilized to identify the match for the object tracks of the objects of interest, e.g., the intruder tracks, e.g., from a previous frame, e.g., the immediately preceding frame, in the current frame. The track in the current frame, e.g., can be identified, e.g., that is closest in image distance (within a user-defined threshold) to the track from the prior frame. In the presently disclosed embodiment of the invention, the distance between the corresponding bounding box centers has been utilized to define the threshold proximity of the bounding boxes from frame to frame.

According to the disclosed embodiment of the present invention at least three possible situations need to be addressed once the nearest match in terms of distance is performed. The first situation can correspond to the case where the matched track in the current frame has the same classifier decision as the one from the previous frame. In that case, the tracks can be considered to have matched. In that instance the track parameters can be updated by simply replacing the bounding box coordinates of the prior matched object of interest, i.e., intruder, with that from the current frame. It will be understood, that within the new frame there may also be detected an unmatched object, e.g., a new object in a new bounding box, in which event a new track can be initialized as outlined above for this new bounding box. The track confidence value can them be modified, e.g. by being incremented by one for the current matched bounding box and the new pixel intensities for the current matched bounding box can also be stored for that track.

The second situation can correspond to the case where the closest object in the current frame that matches an object of interest track, e.g., an intruder track, from a prior frame is classified by the classifier for the current frame as an object of non-interest, e.g., a non-intruder object. This can be, e.g., because the extracted features of the object in the current frame are significantly different from those of the same object in the previous frame, or the filtering out of the image bounding box entirely before any feature sets are determined, i.e., eliminating any image bounding boxes from being considered in the current frame. The change, e.g., in the detected features could be due to, e.g., illumination flickers resulting in momentary changes in classification decision. The other common reasons for change in detected features are when the intruder changes pose or is occluded either partially or completely. To address this problem, according to the disclosed embodiment of the present invention, e.g., a normalized correlation in intensity between the overlapping regions of the two bounding box windows, e.g., one from the current frame and other from the past one, can be computed. If this block correlation value is greater than a certain threshold, then these matching boxes can be considered to be very similar to each other and therefore, can enable, e.g., the re-labeling of the current non-matching track as a matching track, i.e., even though, e.g., the classifier has identified the image in the bounding box as not an object of interest, i.e., as a non-intruder, the bounding box identified by the described block correlation can be considered as matching and the object is reclassified as an object of interest, i.e. as an intruder. This re-labeling may be done, e.g., only if the confidence for the track in the past frame is high enough. The track history can then be suitably updated. In this case, the confidence level for the track in the current frame can be chosen to be modified, e.g., by decrementing it by 1. An approach of this kind according to the disclosed embodiment of the present invention can enable the system 10 to handle various detrimental disturbances in the image, e.g., partial occlusions. For the partial occlusion case, as an example, the present invention can maintain a bounding box of the same or similar dimensions as the prior track as if there had been no occlusion of the tracked image. The track propagation step according to the described embodiment of the present invention can also help in handling a wide range of detrimental disturbances, e.g., a wide range of pose variations.

A third situation can correspond, e.g., to the case where the past track does not have a match with any of the current tracks. In this case the system 10 according to the described embodiment of the present invention can perform a normalized correlation in intensity between the pixels in the bounding box of the object of interest, e.g. the intruder bounding box from the prior frame and a "predicted' bounding box of the object of interest, e.g., the predicted intruder bounding box in the current frame. This prediction, e.g., can involve placing a bounding box of the same size as in the previous frame in the neighborhood of the prior bounding box position and then selecting bounding box position that has the highest correlation in intensity. The decision of the classifier is not modified.

A track termination step according to the described embodiment of the present invention can consist of eliminating an existing track, e.g., if some termination condition is satisfied. According to the presently described embodiment, there are two main termination conditions which can be used. If a track from the past frames does not have a correlation match in the current frame, e.g., due to moving out of the field of view, then the track can be terminated. Also, if, e.g., $N_k$ is too high, then the background model can be reset along with a simultaneous termination of all tracks. In some cases, the system according to the present invention as disclosed might introduce some spurious tracks by tracking those objects that appear momentarily and disappear thereafter. However, the spurious tracks can also be terminated once the background model has stabilized by adapting to the new changes.

Figure 9:
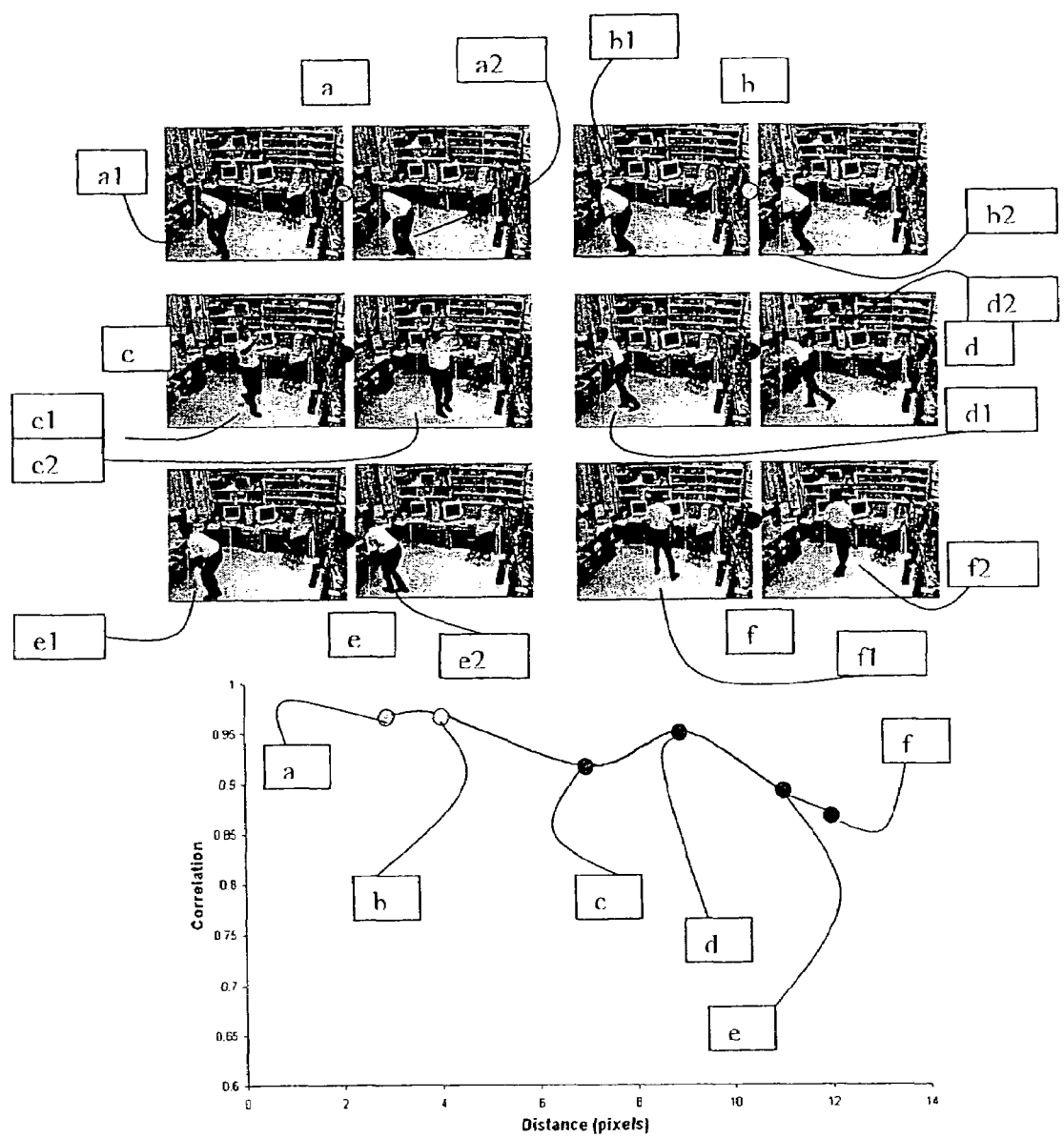
FIG. 9 illustrates the effectiveness of an embodiment of the present invention.
Figure 10:
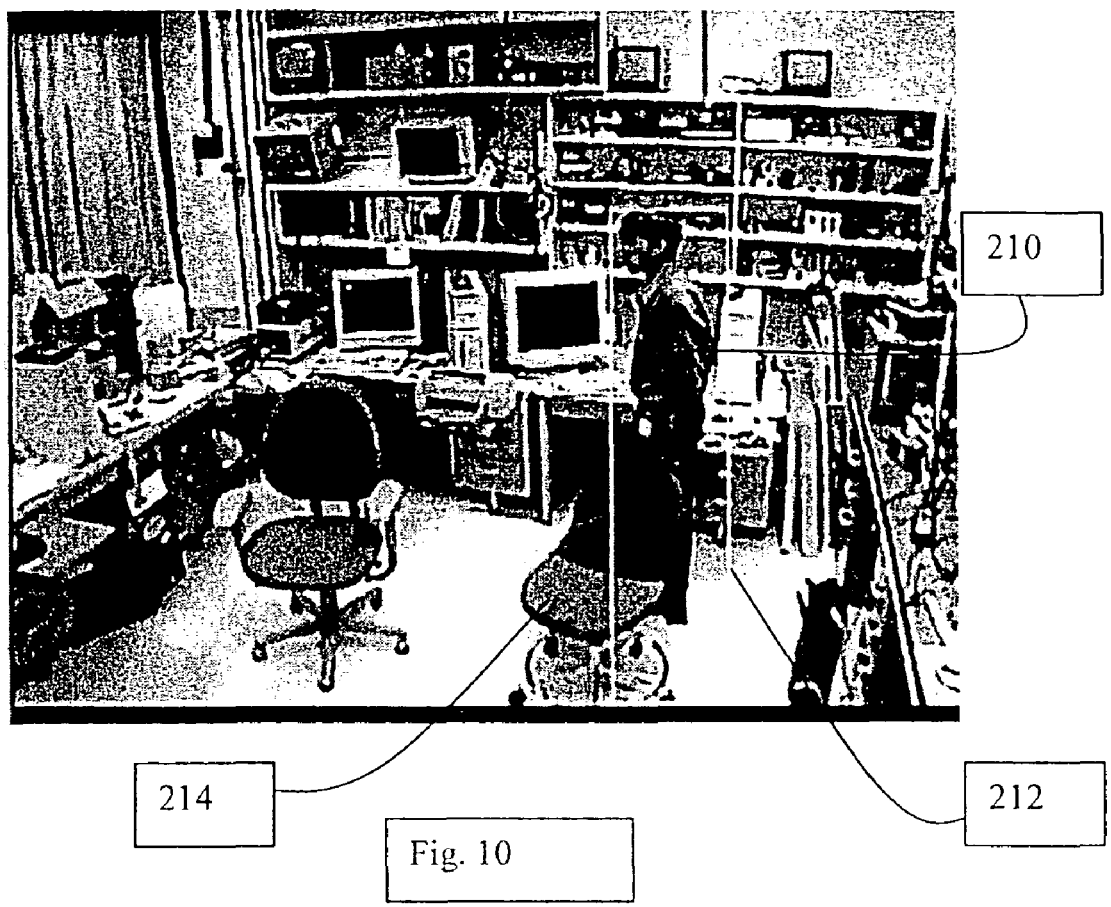
FIG. 10 is an additional illustration of the effectiveness of an embodiment of the present invention.

The disclosed embodiment of the present invention has been tested under a variety of illumination conditions and other simulated environment changes such as moving objects in the scene as well as changing the camera view point of the scene. System performance, e.g., for various pose variations of the object of interest, e.g., the intruder, and for occlusions have indicated a very high recognition confidence at least for human intruders entering the scene depicted in the frames of video data, e.g., despite pose variations between two consecutive frames even when the distance between the matched intruder windows is in the order of 10 pixels. This is very desirable and reflects the robustness of our system to fast movements and drastic changes in pose. In FIG. 9, the intruder is shown enclosed in a white bounding box. The box reflects the track position while the color of the box (white) reflects that the box is identified as an intruder. The plot in FIG. 9 shows the high bounding box correlation values for a variety of intruder poses. In FIG. 10, we show how our system is capable of handling occlusion. The track is still maintained for the intruder as shown in the figure (the box) and is still recognized as an intruder (the box is white in color).

In addition, by using the object classifier to track an object of interest, e.g., an intruder, changes in the background due to lighting or uninteresting objects do not result in additional segmented objects being sent to the object-based video compression module 32, which further improves the compression ratio without loss in video quality. Finally, since the compressed video from the module 32 can be stored on a server 30, e.g., in a dynamic database in object-segmented form, additional services can be provided such as labeling of the objects of interest, e.g., the intruder objects and tracking of the movements of the objects of interest, i.e., the intruder movements. While the presently preferred embodiment of the present invention has been discussed primarily in the context of home and business security systems, the system can also be used for various other video monitoring applications as well. Combining recognition with object-based compression can make the system practical for real-world use, e.g., by both conventional and wireless users.

Turning now to FIG. 8 there is shown an embodiment of a fusion classifier 20 according to an embodiment of the present invention. The fusion classifier 20 may have as its input a plurality of feature sets extracted by feature set extractors from the video data in the video data stream output of the video camera 18, e.g., an edge symmetry feature set provided by the symmetry based feature set extraction 16a, a wavelet feature set extraction set 16b and a template matching feature set extraction 16c, and perhaps others as indicated in FIG. 8. The fusion layer of the decision maker 20 can utilize various algorithms, including dynamically adaptive ones, to identify the objects of interest, e.g., intruder objects from these inputs, using the feature set classifiers in combination, e.g., dynamically varying the reliance upon the input from each classifier, as is explained above Turning now to FIG. 9, there is shown an illustration of the effectiveness of an embodiment of the present invention in its performance as the pose of the object of interest, e.g., a human intruder, varies from pose to pose as seen in scenes a-f, each having a first pose, e.g., a1 and a second pose, e.g., a2. FIG. 9 illustrates that experiments with the presently disclosed embodiment of the present invention have indicated that the embodiment can be utilized to recognize the object of interest, e.g., the human intruder with a high confidence score, e.g., above 85% confidence, e.g., despite variations in the pose from frame to frame, e.g., consecutive frames as shown in FIG. 9, and e.g., even with distances between matched bounding boxes of the object of interest, e.g., the intruder window which are on the order of around 10 pixels. This reflects the robustness of the presently disclosed embodiment of the present invention even to relatively fast movements and relatively drastic changes in pose.

Turning now to FIG. 10, there is shown another illustration of the effectiveness of the presently disclosed embodiment of the present invention even in the face of occlusion of the object of interest 210 by a background object, e.g., a chair 214 that the movement of the object of interest 210, e.g., the human intruder has placed between the object of interest 210 and the video camera. According to the presently preferred embodiment of the present invention, FIG. 10 illustrates that in the frame illustrated the position of the track of the object of interest 210 in the current frame remains in tact in a bounding box 212, and the object of interest 210 is still recognized as an object of interest 210, e.g., an intruder, which can be illustrated in the video display of the system, e.g., by the white color of the bounding box 212.

It will be understood that in operation the disclosed embodiment of the present invention significantly improves the background modeling and makes it more robust in the presence of previously destructive variations in, e.g., the image intensities, the temporary cessation of movement of some or all of the object of interest and/or the partial or total occlusion of the object of interest by a feature that is actually part of the background pixels, but in reality is positioned for a time between the camera and the object of interest as it moves through the scene. For example, reinitializing the background and/or relying on tracking to, e.g., temporarily characterize pixels as non-background pixels, enables this more robust background modeling. According to an aspect of the present invention, e.g., the tracking logic can be utilized to continue to designate the presence of an object of interest in a projected position within the scene, at least for some selected threshold of frames, even when the classifier is indicating there is no object of interest within the scene. This may also be dynamically variable in terms of the preselected number of frames for which the tracking logic is used to override the output of the classifier, e.g., depending upon selected factors, e.g., the length of the prior tracking of a valid object of interest, the location of the track in previous images frames, the indication of massive illumination changes or like disturbances, e.g., in a large portion of the current or recently preceding frame, etc. Also, since the classifier may be most effective when looking only at the foreground/object of interest pixels, the better the process for the creation of the foreground blobs, the more effective the system overall. In addition, the disclosed embodiment which may utilize, e.g., the edge symmetries, e.g., as measured in groups of columns/rows within a bounding box can provide, e.g., classifier input that is robustly utilized as a feature based model of an object of interest and more robustly capable of being learned and/or matched with other learned feature based models of an object of interest of a given type.

In operation the present invention can be effective for providing an enhanced background model, e.g., more effective elimination, frame to frame, of the background pixels, leaving, e.g., a better blob being extracted from the frame. A part of this effectiveness can be traced to the reinitializing of the background upon, e.g., a massive change in registration of background and foreground pixels due, e.g., to a change in illumination or camera movement from frame to frame, and the reliance on segments identified as having an object of interest based, e.g., solely on prior tracking results while, e.g., the background is recreated (modeled), e.g., utilizing the statistical variations of pixels frame to frame as in the initializing process. Another aspect of the present invention enhances the ability to perform video image object tracking through, e.g., the utilization of the characterization of pixels as foreground or background within the segments, e.g., within the bounding boxes, to lessen the computational requirements for carrying out the presently disclosed embodiment of the present invention. Object tracking according to the presently disclosed embodiment of the present invention will be understood to involve, e.g., the initialization of tracking, which may be done based upon the output of the classifier for a given frame of a given threshold number of prior frames (which may be in seriatim or some or all may not be in seriatim) classifying a prospective object of interest in a segment, e.g., in a bounding box, or a portion of a bounding box, as an object of interest, e.g., a human intruder in the scene of the respective frame. The tracking may then be utilized to provide the projections of the segment containing an object of interest into subsequent frames and then may be terminated, e.g., if there are a certain number of frames in which the classifier is unable to identify a segment containing an object of interest in a projected location for such a segment.

The present invention has been described in this application in relation to a particular preferred embodiment, and more specifically in regard to a security system for intruder detection utilizing video data from a surveillance camera. It will be appreciated by those skilled in the art, however, that the present invention as recited in the appended claims is not limited solely to this preferred embodiment. Many improvements, modifications, variations and equivalent arrangements, which would occur to this skilled in the art, should be considered to be part of the present invention as recited in the appended claims. Some examples of such potential modifications, but by no means all such possibilities include: utilizing more than five or differently shaped fuzzy membership functions, dividing the bounding box other than by a single horizontal and vertical set of axes for purposes of symmetric edge detection, utilizing the results, e.g., of tracking to modify the orientation of the bounding box, e.g., for an object of interest to account, e.g., for changes in orientation of the object of interest, e.g., as the intruder being tracked stoops down or crawls on the floor in the scene, etc. Other changes in the video data for an object of interest that is being tracked in a scene, e.g. in the size and shape of the vertical or horizontal projections, aspect ratios, and the like may be used to, e.g., change the orientation of the bounding box. Some one or more of these possible changes in the data regarding the object of interest may be utilized to dynamically make some or all of the above suggested modifications, e.g., changing the number of fuzzy sets. A variety of training algorithms may be utilized, e.g., for forming and utilizing the training module for determining, e.g., the classification of a potential object of interest, such as neural networks, support-vector machines, decision trees and the like, such as a C-5 decision tree operating, e.g., in a dimensional space or dimensional spaces defined, e.g., by the feature sets extracted from the segment(s) being analyzed, which in turn, e.g., may be arranged as vectors or sets of vectors in the feature set dimensional space or spaces.

We claim:

1. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:

a vertical symmetry detector adapted to compute the vertical symmetry of at least one of the set of vertical edge pixels and the set of horizontal edge pixels in each column about a horizontal axis passing through the object segment, and to produce a vertical symmetry value for columns within the object segment;

a horizontal symmetry detector adapted to compute the horizontal symmetry of at least one of the set of vertical edge pixels and set of horizontal edge pixels in each row about a vertical axis passing through the object segment, and to produce a horizontal symmetry value for rows within the object segment; and, an edge symmetry feature set computation apparatus adapted to compute an edge symmetry feature set for the object segment based upon the vertical symmetry values and the horizontal symmetry values; and, a background modeling unit comprising:

a background modeling apparatus adapted to isolate from a current frame at least one segment of the current frame, each of the at least one segments containing a possible object of interest within the current frame, on a frame-wise basis, and to provide as an output each of the at least one segments;

an object of interest classifying apparatus adapted to determine whether or not any segment of the at least one segments output from the background modeling apparatus includes a object of interest and to characterize any such segment as an object segment, utilizing at least in part the edge symmetry feature set;

an object segment tracking apparatus adapted to track the location within the current frame of any object segment, and to determine a projected location of the object segment in a subsequent frame, and to provide the background modeling apparatus with the projected location in the subsequent frame of the object segment; and wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest.

2. The apparatus of claim 1, further comprising:

the edge symmetry unit further comprising:

a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;

a horizontal symmetry detector adapted to compute the horizontal symmetry of set of vertical edge pixels and set of horizontal edge pixels in each row about a vertical axis passing through the object segment, and to produce a horizontal symmetry value for rows within the object segment;

a feature set computation apparatus adapted to compute a feature set for the object segment based upon the vertical symmetry values and the horizontal symmetry values.

3. The apparatus of claim 2, further comprising:

the object segment tracking apparatus further comprising:

a matching apparatus adapted to match the location of an object segment in the current frame to one of a plurality of projected locations of the object segment in the current frame, which projections are based upon the location of the respective object segment in at least one prior frame; and, a track provider adapted to receive and store the location of an object segment in the current frame and over a plurality of prior frames and adapted to provide the projections of the location of the object segment in a subsequent frame based upon the locations of the object segments in the current frame and the plurality of prior frames.

4. The apparatus of claim 3, further comprising:
the vertical symmetry detector is adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis;
the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis.

5. The apparatus of claim 4, further comprising:
the background modeling apparatus is adapted to provide as its output the projected location of the object segment in the subsequent frame in order to override any conflict in the labeling of pixels in the subsequent frame as part of a segment containing a possible object of interest.

6. The apparatus of claim 5, further comprising:
the feature set computation apparatus further comprising:
a horizontal fuzzy set computation apparatus adapted to compute a fuzzy set value for each of a plurality of horizontal fuzzy sets each having a selected weighting function applicable to a selected group of columns within the object segment, with the columns grouped according to position along the horizontal axis in the object segment; and
a vertical fuzzy set computation apparatus adapted to compute a fuzzy set value for each of a plurality of vertical fuzzy sets each having a selected weighting function applicable to a selected group of rows within the object segment, with the rows grouped according to position along the vertical axis in the object segment.

7. The apparatus of claim 6, further comprising:
the background modeling apparatus is adapted to isolate from a current frame the at least one segment of the current frame utilizing the video object plane extracted from the current frame.

8. The apparatus of claim 7, further comprising:
the horizontal fuzzy sets further comprising:
a left extreme fuzzy set having a weighting function that is a constant value for a first selected number of columns from the left border of the object segment toward the vertical axis of the object segment and decreases to zero over a second selected number of columns toward the vertical axis if the object segment;
a right extreme fuzzy set having a weighting function that is a constant value for a third selected number of columns from the right border of the object segment toward the vertical axis of the object segment and decreases to zero over a fourth selected number of columns toward the vertical axis of the object segment; and
at least one horizontal internal fuzzy set having a weighting function that increases from zero to a peak value and decreases to zero as the columns contained in each such internal fuzzy set go from left to right across the object image; and,
the vertical fuzzy sets further comprising:
a bottom extreme fuzzy set having a weighting function that is a constant value for a fifth selected number of rows from the bottom border of the object segment toward the horizontal axis of the object segment and decreases to zero over a sixth selected number of rows toward the horizontal axis if the object segment;
a top extreme fuzzy set having a weighting function that is a constant value for a seventh selected number of columns from the top border of the object segment toward the horizontal axis of the object segment and decreases to zero over an eighth selected number of rows toward the horizontal axis of the object segment; and,
at least one vertical internal fuzzy set having a weighting function that increases from zero to a peak value and decreases to zero as the rows contained in each such vertical internal fuzzy set go from bottom to top across the object image.

9. The apparatus of claim 8, further comprising:
the at least one segment of the current frame is a bounding box.

10. The apparatus of claim 9, further comprising:
the columns associated with each of the horizontal fuzzy sets are overlapping into respective adjacent horizontal fuzzy sets; and,
the rows associated with each of the vertical fuzzy sets are overlapping into respective adjacent vertical fuzzy sets.

11. The apparatus of claim 10, further comprising:
the feature set computation apparatus further comprising a fuzzy set edge value score computing apparatus adapted to compute a fuzzy set edge value based upon the respective horizontal edge value or vertical edge value for the respective column or row and the respective horizontal fuzzy set weighting function value for the respective column or the respective vertical fuzzy set weighting function for the respective row.

12. A video detection apparatus for detecting and following movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:
an edge symmetry detection means comprising:
a vertical symmetry detection means for computing the vertical symmetry of at least one of the set of vertical edge pixels and the set of horizontal edge pixels in each column about a horizontal axis passing through the object segment, and producing a vertical symmetry value for columns within the object segment;
a horizontal symmetry detection means for computing the horizontal symmetry of at least one of the set of vertical edge pixels and set of horizontal edge pixels in each row about a vertical axis passing through the object segment, and producing a horizontal symmetry value for rows within the object segment; and, an edge symmetry feature set computation means for computing an edge symmetry feature set for the object segment based upon the vertical symmetry values and the horizontal symmetry values; and, a background modeling means comprising:

a background modeling means for isolating from a current frame at least one segment of the current frame, each of the at least one segments containing a possible object of interest within the current frame, on a frame-wise basis, and providing as an output each of the at least one segments;

an object of interest classifying means for determining whether or not any segment of the at least one segments output from the background modeling means includes a object of interest and for characterizing any such segment as an object segment, utilizing at least in part the edge symmetry feature set;

an object segment tracking means for tracking the location within the current frame of any object segment, and determining a projected location of the object segment in a subsequent frame, and providing the background modeling means with the projected location in the subsequent frame of the object segment; and wherein the background modeling means includes means for providing as its output the projected location of the object segment in the subsequent frame in lieu of a segment from the subsequent frame determined by the background modeling means to contain a possible object of interest or in the event that the background modeling means is unable in the subsequent frame to locate any segment containing a possible object of interest.

13. The apparatus of claim 12, further comprising:

the edge symmetry unit further comprising:

the vertical symmetry detection means is a means for computing the vertical symmetry of the set of vertical edge pixels and the set of horizontal edge pixels in each column about a horizontal axis passing through the object segment, and producing a vertical symmetry value for columns within the object segment;

the horizontal symmetry detection means is a means for computing the horizontal symmetry of the set of vertical edge pixels and the set of horizontal edge pixels in each row about a vertical axis passing through the object segment, and producing a horizontal symmetry value for rows within the object segment.

14. The apparatus of claim 13, further comprising:

the object segment tracking means further comprising:

a matching means for matching the location of an object segment in the current frame to one of a plurality of projected locations of the object segment in the current frame, which projections are based upon the location of the respective object segment in at least one prior frame; and, a track providing means for receiving and storing the location of an object segment in the current frame and over at least one of a plurality of prior frames and for providing the projections of the location of the object segment in a subsequent frame based upon the locations of the object segments in the current frame and at least one of the plurality of prior frames.

15. The apparatus of claim 14, further comprising:

the vertical symmetry detection means includes means for computing the vertical symmetry value of the set of horizontal edges and the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis;

the horizontal symmetry detection means includes means for computing the horizontal symmetry value of the set of horizontal edges and the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis.

16. The apparatus of claim 15, further comprising:

the background modeling means including means for providing as its output the projected location of the object segment in the subsequent frame in order to override any conflict in the labeling of pixels in the subsequent frame as part of a segment containing a possible object of interest.

17. The apparatus of claim 16, further comprising:

the feature set computation means further comprising:

a horizontal fuzzy set computation means for computing a fuzzy set value for each of a plurality of horizontal fuzzy sets each having a selected weighting function applicable to a selected group of columns within the object segment, with the columns grouped according to position along the horizontal axis in the object segment; and a vertical fuzzy set computation means for computing a fuzzy set value for each of a plurality of vertical fuzzy sets each having a selected weighting function applicable to a selected group of rows within the object segment, with the rows grouped according to position along the vertical axis in the object segment.

18. The apparatus of claim 17, further comprising:

the background modeling means including means for isolating from a current frame the at least one segment of the current frame utilizing the video object plane extracted from the current frame.

19. The apparatus of claim 18, further comprising:

the horizontal fuzzy sets further comprising:

a left extreme fuzzy set having a weighting function that is a constant value for a first selected number of columns from the left border of the object segment toward the vertical axis of the object segment and decreases to zero over a second selected number of columns toward the vertical axis if the object segment;

a right extreme fuzzy set having a weighting function that is a constant value for a third selected number of columns from the right border of the object segment toward the vertical axis of the object segment and decreases to zero over a fourth selected number of columns toward the vertical axis of the object segment; and at least one horizontal internal fuzzy set having a weighting function that increases from zero to a peak value and decreases to zero as the columns contained in each such internal fuzzy set go from left to right across the object image; and, the vertical fuzzy sets further comprising:

a bottom extreme fuzzy set having a weighting function that is a constant value for a fifth selected number of rows from the bottom border of the object segment toward the horizontal axis of the object segment and decreases to zero over a sixth selected number of rows toward the horizontal axis if the object segment;

a top extreme fuzzy set having a weighting function that is a constant value for a seventh selected number of columns from the top border of the object segment toward the horizontal axis of the object segment and decreases to zero over an eighth selected number of rows toward the horizontal axis of the object segment; and, at least one vertical internal fuzzy set having a weighting function that increases from zero to a peak value and decreases to zero as the rows contained in each such vertical internal fuzzy set go from bottom to top across the object image.

20. The apparatus of claim 19, further comprising:
the at least one segment of the current frame isolated from the current frame by the background modeling means is a bounding box.

21. The apparatus of claim 20, further comprising:
the columns associated with each of the horizontal fuzzy sets are overlapping into respective adjacent horizontal fuzzy sets; and,
the rows associated with each of the vertical fuzzy sets are overlapping into respective adjacent vertical fuzzy sets.

22. The apparatus of claim 21, further comprising:
the feature set computation means further comprising a fuzzy set edge value score computing means for computing a fuzzy set edge value based upon the respective horizontal edge value or vertical edge value for the respective column or row and the respective horizontal fuzzy set weighting function value for the respective column or the respective vertical fuzzy set weighting function for the respective row.

23. A video detection method for detecting and following movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

utilizing an edge symmetry detection unit:
computing the vertical symmetry of at least one of the set of vertical edge pixels and the set of horizontal edge pixels in each column about a horizontal axis passing through the object segment, and producing a vertical symmetry value for columns within the object segment;
computing the horizontal symmetry of at least one of the set of vertical edge pixels and set of horizontal edge pixels in each row about a vertical axis passing through the object segment, and producing a horizontal symmetry value for rows within the object segment; and,
computing an edge symmetry feature set for the object segment based upon the vertical symmetry values and the horizontal symmetry values; and, utilizing a background modeling unit comprising:
isolating from a current frame at least one segment of the current frame, each of the at least one segments containing a possible object of interest within the current frame, on a frame-wise basis, and providing as an output each of the at least one segments;
determining whether or not any segment of the at least one segments output from the background modeling means includes a object of interest and for characterizing any such segment as an object segment, utilizing at least in part the edge symmetry feature set;
tracking the location within the current frame of any object segment, and determining a projected location of the object segment in a subsequent frame, and providing the background modeling means with the projected location in the subsequent frame of the object segment; and
wherein the background modeling unit includes means for providing as its output the projected location of the object segment in the subsequent frame in lieu of a segment from the subsequent frame determined by the background modeling means to contain a possible object of interest or in the event that the background modeling means is unable in the subsequent frame to locate any segment containing a possible object of interest.

24. The method of claim 23, further comprising:
the utilization of the edge symmetry unit further comprising:
computing the vertical symmetry of the set of vertical edge pixels and the set of horizontal edge pixels in each column about a horizontal axis passing through the object segment, and producing a vertical symmetry value for columns within the object segment; and,
computing the horizontal symmetry of the set of vertical edge pixels and the set of horizontal edge pixels in each row about a vertical axis passing through the object segment, and producing a horizontal symmetry value for rows within the object segment.

25. The method of claim 24, further comprising:
the utilization of the object segment tracking means further comprising:
matching the location of an object segment in the current frame to one of a plurality of projected locations of the object segment in the current frame, which projections are based upon the location of the respective object segment in at least one prior frame; and,
receiving and storing the location of an object segment in the current frame and over at least one of a plurality of prior frames and for providing the projections of the location of the object segment in a subsequent frame based upon the locations of the object segments in the current frame and at least one of the plurality of prior frames.

26. The method of claim 25, further comprising:
computing the vertical symmetry value of the set of horizontal edges and the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and, computing the horizontal symmetry value of the set of horizontal edges and the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis.

27. The method of claim 26, further comprising:
the background modeling means including means for providing as its output the projected location of the object segment in the subsequent frame in order to override any conflict in the labeling of pixels in the subsequent frame as part of a segment containing a possible object of interest.

28. The method of claim 27, further comprising:
computing a fuzzy set value for each of a plurality of horizontal fuzzy sets each having a selected weighting function applicable to a selected group of columns within the object segment, with the columns grouped according to position along the horizontal axis in the object segment; and computing a fuzzy set value for each of a plurality of vertical fuzzy sets each having a selected weighting function applicable to a selected group of rows within the object segment, with the rows grouped according to position along the vertical axis in the object segment.

29. The apparatus of claim 28, further comprising:
isolating from a current frame the at least one segment of the current frame utilizing the video object plane extracted from the current frame.

30. The method of claim 29, further comprising:
the horizontal fuzzy sets further comprising:
a left extreme fuzzy set having a weighting function that is a constant value for a first selected number of columns from the left border of the object segment toward the vertical axis of the object segment and decreases to zero over a second selected number of columns toward the vertical axis if the object segment;
a right extreme fuzzy set having a weighting function that is a constant value for a third selected number of columns from the right border of the object segment toward the vertical axis of the object segment and decreases to zero over a fourth selected number of columns toward the vertical axis of the object segment; and at least one horizontal internal fuzzy set having a weighting function that increases from zero to a peak value and decreases to zero as the columns contained in each such internal fuzzy set go from left to right across the object image; and, the vertical fuzzy sets further comprising:
a bottom extreme fuzzy set having a weighting function that is a constant value for a fifth selected number of rows from the bottom border of the object segment toward the horizontal axis of the object segment and decreases to zero over a sixth selected number of rows toward the horizontal axis if the object segment;

a top extreme fuzzy set having a weighting function that is a constant value for a seventh selected number of columns from the top border of the object segment toward the horizontal axis of the object segment and decreases to zero over an eighth selected number of rows toward the horizontal axis of the object segment; and, at least one vertical internal fuzzy set having a weighting function that increases from zero to a peak value and decreases to zero as the rows contained in each such vertical internal fuzzy set go from bottom to top across the object image.

31. The apparatus of claim 30, further comprising:
the at least one segment of the current frame isolated from the current frame by the background modeling means is a bounding box.

32. The method of claim 31, further comprising:
the columns associated with each of the horizontal fuzzy sets are overlapping into respective adjacent horizontal fuzzy sets; and,
the rows associated with each of the vertical fuzzy sets are overlapping into respective adjacent vertical fuzzy sets.

33. The method of claim 32, further comprising:
computing a fuzzy set edge value based upon the respective horizontal edge value or vertical edge value for the respective column or row and the respective horizontal fuzzy set weighting function value for the respective column or the respective vertical fuzzy set weighting function for the respective row.

34. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:
a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;

a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and, an edge symmetry feature set computation apparatus adapted to compute an edge symmetry feature set for the object segment based upon the vertical symmetry values and the horizontal symmetry values; and, a background modeling unit comprising:
a background modeling apparatus adapted to isolate from a current frame at least one segment of the current frame, each of the at least one segments containing a possible object of interest within the current frame, on a frame-wise basis, and to provide as an output each of the at least one segments;

an object of interest classifying apparatus adapted to determine whether or not any segment of the at least one segments output from the background modeling apparatus includes a object of interest and to characterize any such segment as an object segment, utilizing at least in part the edge symmetry feature set;

an object segment tracking apparatus adapted to track the location within the current frame of any object segment, and to determine a projected location of the object segment in a subsequent frame, and to provide the background modeling apparatus with the projected location in the subsequent frame of the object segment;

wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and, the object segment tracking apparatus further comprising:

a matching apparatus adapted to match the location of an object segment in the current frame to one of a plurality of projected locations of the object segment in the current frame, which projections are based upon the location of the respective object segment in at least one prior frame; and, a track provider adapted to receive and store the location of an object segment in the current frame and over a plurality of prior frames and adapted to provide the projections of the location of the object segment in a subsequent frame based upon the locations of the object segments in the current frame and the plurality of prior frames.

35. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:

a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;

a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and, an edge symmetry feature set computation apparatus adapted to compute an edge symmetry feature set for the object segment based upon the vertical symmetry values and the horizontal symmetry values; and, a background modeling unit comprising:

a background modeling apparatus adapted to isolate from a current frame at least one segment of the current frame, each of the at least one segments containing a possible object of interest within the current frame, on a frame-wise basis, and to provide as an output each of the at least one segments;

an object of interest classifying apparatus adapted to determine whether or not any segment of the at least one segments output from the background modeling apparatus includes a object of interest and to characterize any such segment as an object segment, utilizing at least in part the edge symmetry feature set;

an object segment tracking apparatus adapted to track the location within the current frame of any object segment, and to determine a projected location of the object segment in a subsequent frame, and to provide the background modeling apparatus with the projected location in the subsequent frame of the object segment;

wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and, the object segment tracking apparatus further comprising:

a matching apparatus adapted to match the location of an object segment in the current frame to one of a plurality of projected locations of the object segment in the current frame, which projections are based upon the location of the respective object segment in at least one prior frame;

a track provider adapted to receive and store the location of an object segment in the current frame and over a plurality of prior frames and adapted to provide the projections of the location of the object segment in a subsequent frame based upon the locations of the object segments in the current frame and the plurality of prior frames; and, the vertical symmetry detector is adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and, the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis.

36. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:
a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;
a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and,
an edge symmetry feature set computation apparatus adapted to compute an edge symmetry feature set for the object segment based upon the vertical symmetry values and the horizontal symmetry values; and,
a background modeling unit comprising:
a background modeling apparatus adapted to isolate from a current frame at least one segment of the current frame, each of the at least one segments containing a possible object of interest within the current frame, on a frame-wise basis, and to provide as an output each of the at least one segments;
an object of interest classifying apparatus adapted to determine whether or not any segment of the at least one segments output from the background modeling apparatus includes a object of interest and to characterize any such segment as an object segment, utilizing at least in part the edge symmetry feature set;
an object segment tracking apparatus adapted to track the location within the current frame of any object segment, and to determine a projected location of the object segment in a subsequent frame, and to provide the background modeling apparatus with the projected location in the subsequent frame of the object segment;
wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and,
the object segment tracking apparatus further comprising:
a matching apparatus adapted to match the location of an object segment in the current frame to one of a plurality of projected locations of the object segment in the current frame, which projections are based upon the location of the respective object segment in at least one prior frame;
a track provider adapted to receive and store the location of an object segment in the current frame and over a plurality of prior frames and adapted to provide the projections of the location of the object segment in a subsequent frame based upon the locations of the object segments in the current frame and the plurality of prior frames; and,
the vertical symmetry detector is adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and,
the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis; and,
the background modeling apparatus is adapted to provide as its output the projected location of the object segment in the subsequent frame in order to override any conflict in the labeling of pixels in the subsequent frame as part of a segment containing a possible object of interest.

37. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:
an edge symmetry detection unit comprising:
a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;
a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and,
an edge symmetry feature set computation apparatus adapted to compute an edge symmetry feature set for the object segment based upon the vertical symmetry values and the horizontal symmetry values; and,
a background modeling unit comprising:
a background modeling apparatus adapted to isolate from a current frame at least one segment of the current frame, each of the at least one segments containing a possible object of interest within the current frame, on a frame-wise basis, and to provide as an output each of the at least one segments;
an object of interest classifying apparatus adapted to determine whether or not any segment of the at least one segments output from the background modeling apparatus includes a object of interest and to characterize any such segment as an object segment, utilizing at least in part the edge symmetry feature set;
an object segment tracking apparatus adapted to track the location within the current frame of any object segment, and to determine a projected location of the object segment in a subsequent frame, and to provide the background modeling apparatus with the projected location in the subsequent frame of the object segment;

wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and, the object segment tracking apparatus further comprising:

a matching apparatus adapted to match the location of an object segment in the current frame to one of a plurality of projected locations of the object segment in the current frame, which projections are based upon the location of the respective object segment in at least one prior frame;

a track provider adapted to receive and store the location of an object segment in the current frame and over a plurality of prior frames and adapted to provide the projections of the location of the object segment in a subsequent frame based upon the locations of the object segments in the current frame and the plurality of prior frames; and, the vertical symmetry detector is adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and, the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis;

the background modeling apparatus is adapted to provide as its output the projected location of the object segment in the subsequent frame in order to override any conflict in the labeling of pixels in the subsequent frame as part of a segment containing a possible object of interest; and, the feature set computation apparatus further comprising:

a horizontal fuzzy set computation apparatus adapted to compute a fuzzy set value for each of a plurality of horizontal fuzzy sets each having a selected weighting function applicable to a selected group of columns within the object segment, with the columns grouped according to position along the horizontal axis in the object segment; and, a vertical fuzzy set computation apparatus adapted to compute a fuzzy set value for each of a plurality of vertical fuzzy sets each having a selected weighting function applicable to a selected group of rows within the object segment, with the rows grouped according to position along the vertical axis in the object segment.

38. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:

a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;

a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and, an edge symmetry feature set computation apparatus adapted to compute an edge symmetry feature set for the object segment based upon the vertical symmetry values and the horizontal symmetry values; and, a background modeling unit comprising:

a background modeling apparatus adapted to isolate from a current frame at least one segment of the current frame, each of the at least one segments containing a possible object of interest within the current frame, on a frame-wise basis, and to provide as an output each of the at least one segments;

an object of interest classifying apparatus adapted to determine whether or not any segment of the at least one segments output from the background modeling apparatus includes a object of interest and to characterize any such segment as an object segment, utilizing at least in part the edge symmetry feature set;

an object segment tracking apparatus adapted to track the location within the current frame of any object segment, and to determine a projected location of the object segment in a subsequent frame, and to provide the background modeling apparatus with the projected location in the subsequent frame of the object segment;

wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and, the object segment tracking apparatus further comprising:

a matching apparatus adapted to match the location of an object segment in the current frame to one of a plurality of projected locations of the object segment in the current frame, which projections are based upon the location of the respective object segment in at least one prior frame;

a track provider adapted to receive and store the location of an object segment in the current frame and over a plurality of prior frames and adapted to provide the projections of the location of the object segment in a subsequent frame based upon the locations of the object segments in the current frame and the plurality of prior frames; and, the vertical symmetry detector is adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and, the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis;

the background modeling apparatus is adapted to provide as its output the projected location of the object segment in the subsequent frame in order to override any conflict in the labeling of pixels in the subsequent frame as part of a segment containing a possible object of interest;

the feature set computation apparatus further comprising:

a horizontal fuzzy set computation apparatus adapted to compute a fuzzy set value for each of a plurality of horizontal fuzzy sets each having a selected weighting function applicable to a selected group of columns within the object segment, with the columns grouped according to position along the horizontal axis in the object segment; and, a vertical fuzzy set computation apparatus adapted to compute a fuzzy set value for each of a plurality of vertical fuzzy sets each having a selected weighting function applicable to a selected group of rows within the object segment, with the rows grouped according to position along the vertical axis in the object segment; and, the background modeling apparatus is adapted to isolate from a current frame the at least one segment of the current frame utilizing the video object plane extracted from the current frame.

39. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:
   a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;
   a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and,
   an edge symmetry feature set computation apparatus adapted to compute an edge symmetry feature set for the object segment based upon the vertical symmetry values and the horizontal symmetry values; and,
   a background modeling unit comprising:
   a background modeling apparatus adapted to isolate from a current frame at least one segment of the current frame, each of the at least one segments containing a possible object of interest within the current frame, on a frame-wise basis, and to provide as an output each of the at least one segments;
   an object of interest classifying apparatus adapted to determine whether or not any segment of the at least one segments output from the background modeling apparatus includes a object of interest and to characterize any such segment as an object segment, utilizing at least in part the edge symmetry feature set;
   an object segment tracking apparatus adapted to track the location within the current frame of any object segment, and to determine a projected location of the object segment in a subsequent frame, and to provide the background modeling apparatus with the projected location in the subsequent frame of the object segment;
   wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and,
   the object segment tracking apparatus further comprising:
   a matching apparatus adapted to match the location of an object segment in the current frame to one of a plurality of projected locations of the object segment in the current frame, which projections are based upon the location of the respective object segment in at least one prior frame;

a track provider adapted to receive and store the location of an object segment in the current frame and over a plurality of prior frames and adapted to provide the projections of the location of the object segment in a subsequent frame based upon the locations of the object segments in the current frame and the plurality of prior frames; and, the vertical symmetry detector is adapted to compute the vertical symmetry value of at least one of the set of horizontal edges or the set of vertical edges in a (given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and, the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis;

the background modeling apparatus is adapted to provide as its output the projected location of the object segment in the subsequent frame in order to override any conflict in the labeling of pixels in the subsequent frame as part of a segment containing a possible object of interest;

the feature set computation apparatus further comprising:

a horizontal fuzzy set computation apparatus adapted to compute a fuzzy set value for each of a plurality of horizontal fuzzy sets each having a selected weighting function applicable to a selected group of columns within the object segment, with the columns grouped according to position along the horizontal axis in the object segment; and, a vertical fuzzy set computation apparatus adapted to compute a fuzzy set value for each of a plurality of vertical fuzzy sets each having a selected weighting function applicable to a selected group of rows within the object segment, with the rows grouped according to position along the vertical axis in the object segment; and, the background modeling apparatus is adapted to isolate from a current frame the at least one segment of the current frame utilizing the video object plane extracted from the current frame; and the horizontal fuzzy sets further comprising:

a left extreme fuzzy set having a weighting function that is a constant value for a first selected number of columns from the left border of the object segment toward the vertical axis of the object segment and decreases to zero over a second selected number of columns toward the vertical axis if the object segment;

a right extreme fuzzy set having a weighting function that is a constant value for a third selected number of columns from the right border of the object segment toward the vertical axis of the object segment and decreases to zero over a fourth selected number of columns toward the vertical axis of the object segment; and at least one horizontal internal fuzzy set having a weighting function that increases from zero to a peak value and decreases to zero as the columns contained in each such internal fuzzy set go from left to right across the object image;

the vertical fuzzy sets further comprising:

a bottom extreme fuzzy set having a weighting function that is a constant value for a fifth selected number of rows from the bottom border of the object segment toward the horizontal axis of the object segment and decreases to zero over a sixth selected number of rows toward the horizontal axis if the object segment;

a top extreme fuzzy set having a weighting function that is a constant value for a seventh selected number of columns from the top border of the object segment toward the horizontal axis of the object segment and decreases to zero over an eighth selected number of rows toward the horizontal axis of the object segment; and, at least one vertical internal fuzzy set having a weighting function that increases from zero to a peak value and decreases to zero as the rows contained in each such vertical internal fuzzy set go from bottom to top across the object image.

40. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:

a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;

a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and, an edge symmetry feature set computation apparatus adapted to compute an edge symmetry feature set for the object segment based upon the vertical symmetry values and the horizontal symmetry values; and, a background modeling unit comprising:

a background modeling apparatus adapted to isolate from a current frame at least one segment of the current frame, each of the at least one segments containing a possible object of interest within the current frame, on a frame-wise basis, and to provide as an output each of the at least one segments;

an object of interest classifying apparatus adapted to determine whether or not any segment of the at least one segments output from the background modeling apparatus includes a object of interest and to characterize any such segment as an object segment, utilizing at least in part the edge symmetry feature set;

an object segment tracking apparatus adapted to track the location within the current frame of any object segment, and to determine a projected location of the object segment in a subsequent frame, and to provide the background modeling apparatus with the projected location in the subsequent frame of the object segment;

wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and, the object segment tracking apparatus further comprising:
a matching apparatus adapted to match the location of an object segment in the current frame to one of a plurality of projected locations of the object segment in the current frame, which projections are based upon the location of the respective object segment in at least one prior frame;

a track provider adapted to receive and store the location of an object segment in the current frame and over a plurality of prior frames and adapted to provide the projections of the location of the object segment in a subsequent frame based upon the locations of the object segments in the current frame and the plurality of prior frames; and, the vertical symmetry detector is adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and, the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis;

the background modeling apparatus is adapted to provide as its output the projected location of the object segment in the subsequent frame in order to override any conflict in the labeling of pixels in the subsequent frame as part of a segment containing a possible object of interest;

the feature set computation apparatus further comprising:
a horizontal fuzzy set computation apparatus adapted to compute a fuzzy set value for each of a plurality of horizontal fuzzy sets each having a selected weighting function applicable to a selected group of columns within the object segment, with the columns grouped according to position along the horizontal axis in the object segment; and, a vertical fuzzy set computation apparatus adapted to compute a fuzzy set value for each of a plurality of vertical fuzzy sets each having a selected weighting function applicable to a selected group of rows within the object segment, with the rows grouped according to position along the vertical axis in the object segment; and, the background modeling apparatus is adapted to isolate from a current frame the at least one segment of the current frame utilizing the video object plane extracted from the current frame; and the horizontal fuzzy sets further comprising:
a left extreme fuzzy set having a weighting function that is a constant value for a first selected number of columns from the left border of the object segment toward the vertical axis of the object segment and decreases to zero over a second selected number of columns toward the vertical axis if the object segment;

a right extreme fuzzy set having a weighting function that is a constant value for a third selected number of columns from the right border of the object segment toward the vertical axis of the object segment and decreases to zero over a fourth selected number of columns toward the vertical axis of the object segment; and at least one horizontal internal fuzzy set having a weighting function that increases from zero to a peak value and decreases to zero as the columns contained in each such internal fuzzy set go from left to right across the object image;

the vertical fuzzy sets further comprising:
a bottom extreme fuzzy set having a weighting function that is a constant value for a fifth selected number of rows from the bottom border of the object segment toward the horizontal axis of the object segment and decreases to zero over a sixth selected number of rows toward the horizontal axis if the object segment;

a top extreme fuzzy set having a weighting function that is a constant value for a seventh selected number of columns from the top border of the object segment toward the horizontal axis of the object segment and decreases to zero over an eighth selected number of rows toward the horizontal axis of the object segment; and, at least one vertical internal fuzzy set having a weighting function that increases from zero to a peak value and decreases to zero as the rows contained in each such vertical internal fuzzy set go from bottom to top across the object image; and, the at least one segment of the current frame is a bounding box.

41. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:
a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;

a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and, an edge symmetry feature set computation apparatus adapted to compute an edge symmetry feature set for the object segment based upon the vertical symmetry values and the horizontal symmetry values; and, a background modeling unit comprising:
a background modeling apparatus adapted to isolate from a current frame at least one segment of the current frame, each of the at least one segments containing a possible object of interest within the current frame, on a frame-wise basis, and to provide as an output each of the at least one segments;
an object of interest classifying apparatus adapted to determine whether or not any segment of the at least one segments output from the background modeling apparatus includes a object of interest and to characterize any such segment as an object segment, utilizing at least in part the edge symmetry feature set;
an object segment tracking apparatus adapted to track the location within the current frame of any object segment, and to determine a projected location of the object segment in a subsequent frame, and to provide the background modeling apparatus with the projected location in the subsequent frame of the object segment;
wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and,
the object segment tracking apparatus further comprising:
a matching apparatus adapted to match the location of an object segment in the current frame to one of a plurality of projected locations of the object segment in the current frame, which projections are based upon the location of the respective object segment in at least one prior frame;
a track provider adapted to receive and store the location of an object segment in the current frame and over a plurality of prior frames and adapted to provide the projections of the location of the object segment in a subsequent frame based upon the locations of the object segments in the current frame and the plurality of prior frames; and,
the vertical symmetry detector is adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and,
the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis;
the background modeling apparatus is adapted to provide as its output the projected location of the object segment in the subsequent frame in order to override any conflict in the labeling of pixels in the subsequent frame as part of a segment containing a possible object of interest;
the feature set computation apparatus further comprising:
a horizontal fuzzy set computation apparatus adapted to compute a fuzzy set value for each of a plurality of horizontal fuzzy sets each having a selected weighting function applicable to a selected group of columns within the object segment, with the columns grouped according to position along the horizontal axis in the object segment; and,
a vertical fuzzy set computation apparatus adapted to compute a fuzzy set value for each of a plurality of vertical fuzzy sets each having a selected weighting function applicable to a selected group of rows within the object segment, with the rows grouped according to position along the vertical axis in the object segment; and,
the background modeling apparatus is adapted to isolate from a current frame the at least one segment of the current frame utilizing the video object plane extracted from the current frame; and
the horizontal fuzzy sets further comprising:
a left extreme fuzzy set having a weighting function that is a constant value for a first selected number of columns from the left border of the object segment toward the vertical axis of the object segment and decreases to zero over a second selected number of columns toward the vertical axis if the object segment;
a right extreme fuzzy set having a weighting function that is a constant value for a third selected number of columns from the right border of the object segment toward the vertical axis of the object segment and decreases to zero over a fourth selected number of columns toward the vertical axis of the object segment; and
at least one horizontal internal fuzzy set having a weighting function that increases from zero to a peak value and decreases to zero as the columns contained in each such internal fuzzy set go from left to right across the object image;
the vertical fuzzy sets further comprising:
a bottom extreme fuzzy set having a weighting function that is a constant value for a fifth selected number of rows from the bottom border of the object segment toward the horizontal axis of the object segment and decreases to zero over a sixth selected number of rows toward the horizontal axis if the object segment;
a top extreme fuzzy set having a weighting function that is a constant value for a seventh selected number of columns from the top border of the object segment toward the horizontal axis of the object segment and decreases to zero over an eighth selected number of rows toward the horizontal axis of the object segment; and,
at least one vertical internal fuzzy set having a weighting function that increases from zero to a peak value and decreases to zero as the rows contained in each such vertical internal fuzzy set go from bottom to top across the object image;
the at least one segment of the current frame is a bounding box; and, the columns associated with each of the horizontal fuzzy sets are overlapping into respective adjacent horizontal fuzzy sets; and, the rows associated with each of the vertical fuzzy sets are overlapping into respective adjacent vertical fuzzy sets.

42. A video detection apparatus adapted to detect and follow movement of a predefined object of interest within the video data of the output of a video camera encoded in frame-wise data, each frame occurring at sequential time intervals, and including the segmentation of at least one portion of the frame-wise data, an object segment, as potentially including the preselected object of interest, and including vertical edge pixels and horizontal edge pixels detected to be present within the object segment, comprising:

an edge symmetry detection unit comprising:

a vertical symmetry detector adapted to compute the vertical symmetry of the set of vertical edge pixels and the set of horizontal edge pixels in each column about a horizontal axis passing through the object segment, and to produce a vertical symmetry value for columns within the object segment;

a horizontal symmetry detector adapted to compute the horizontal symmetry of the set of vertical edge pixels and set of horizontal edge pixels in each row about a vertical axis passing through the object segment, and to produce a horizontal symmetry value for rows within the object segment; and, an edge symmetry feature set computation apparatus adapted to compute an edge symmetry feature set for the object segment based upon the vertical symmetry values and the horizontal symmetry values; and, a background modeling unit comprising:

a background modeling apparatus adapted to isolate from a current frame at least one segment of the current frame, each of the at least one segments containing a possible object of interest within the current frame, on a frame-wise basis, and to provide as an output each of the at least one segments;

an object of interest classifying apparatus adapted to determine whether or not any segment of the at least one segments output from the background modeling apparatus includes a object of interest and to characterize any such segment as an object segment, utilizing at least in part the edge symmetry feature set;

an object segment tracking apparatus adapted to track the location within the current frame of any object segment, and to determine a projected location of the object segment in a subsequent frame, and to provide the background modeling apparatus with the projected location in the subsequent frame of the object segment;

wherein the background modeling apparatus is adapted to provide as its output the projected location of the object segment in the subsequent frame in lieu of a segment from the subsequent frame determined by the background modeling apparatus to contain a possible object of interest or in the event that the background modeling apparatus is unable in the subsequent frame to locate any segment containing a possible object of interest; and, the object segment tracking apparatus further comprising:

a matching apparatus adapted to match the location of an object segment in the current frame to one of a plurality of projected locations of the object segment in the current frame, which projections are based upon the location of the respective object segment in at least one prior frame;

a track provider adapted to receive and store the location of an object segment in the current frame and over a plurality of prior frames and adapted to provide the projections of the location of the object segment in a subsequent frame based upon the locations of the object segments in the current frame and the plurality of prior frames; and, the vertical symmetry detector is adapted to compute the vertical symmetry value of at least one of the set of horizontal edges or the set of vertical edges in a given column i as the ratio of the number of horizontal edge pixels or vertical edge pixels, respectively, in each column i on opposing sides of the horizontal axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the horizontal axis; and, the horizontal symmetry detector is adapted to compute the horizontal symmetry value of at least one of the set of horizontal edges or the set of vertical edges in a given row j as the ratio of the number of horizontal edge pixels or vertical edge pixels, respectively, in each row j on opposing sides of the vertical axis, independent of which side has more horizontal edge pixels or vertical edge pixels, respectively, expressed as a number between 0, if there are no horizontal edge pixels or no vertical edge pixels, respectively, on either side of the horizontal axis and 1.0 if there are, respectively, an equal number of horizontal edge pixels or vertical edge pixels, respectively on both sides of the vertical axis;

the background modeling apparatus is adapted to provide as its output the projected location of the object segment in the subsequent frame in order to override any conflict in the labeling of pixels in the subsequent frame as part of a segment containing a possible object of interest;

the feature set computation apparatus further comprising:

a horizontal fuzzy set computation apparatus adapted to compute a fuzzy set value for each of a plurality of horizontal fuzzy sets each having a selected weighting function applicable to a selected group of columns within the object segment, with the columns grouped according to position along the horizontal axis in the object segment; and, a vertical fuzzy set computation apparatus adapted to compute a fuzzy set value for each of a plurality of vertical fuzzy sets each having a selected weighting function applicable to a selected group of rows within the object segment, with the rows grouped according to position along the vertical axis in the object segment; and, the background modeling apparatus is adapted to isolate from a current frame the at least one segment of the current frame utilizing the video object plane extracted from the current frame; and the horizontal fuzzy sets further comprising:

a left extreme fuzzy set having a weighting function that is a constant value for a first selected number of columns from the left border of the object segment toward the vertical axis of the object segment and decreases to zero over a second selected number of columns toward the vertical axis if the object segment;

a right extreme fuzzy set having a weighting function that is a constant value for a third selected number of columns from the right border of the object segment toward the vertical axis of the object segment and decreases to zero over a fourth selected number of columns toward the vertical axis of the object segment; and at least one horizontal internal fuzzy set having a weighting function that increases from zero to a peak value and decreases to zero as the columns contained in each such internal fuzzy set go from left to right across the object image;

the vertical fuzzy sets further comprising:

a bottom extreme fuzzy set having a weighting function that is a constant value for a fifth selected number of rows from the bottom border of the object segment toward the horizontal axis of the object segment and decreases to zero over a sixth selected number of rows toward the horizontal axis if the object segment;

a top extreme fuzzy set having a weighting function that is a constant value for a seventh selected number of columns from the top border of the object segment toward the horizontal axis of the object segment and decreases to zero over an eighth selected number of rows toward the horizontal axis of the object segment; and, at least one vertical internal fuzzy set having a weighting function that increases from zero to a peak value and decreases to zero as the rows contained in each such vertical internal fuzzy set go from bottom to top across the object image;

the at least one segment of the current frame is a bounding box;

the columns associated with each of the horizontal fuzzy sets are overlapping into respective adjacent horizontal fuzzy sets; and, the rows associated with each of the vertical fuzzy sets are overlapping into respective adjacent vertical fuzzy sets; and, the feature set computation apparatus further comprising a fuzzy set edge value score computing apparatus adapted to compute a fuzzy set edge value based upon the respective horizontal edge value or vertical edge value for the respective column or row and the respective horizontal fuzzy set weighting function value for the respective column or the respective vertical fuzzy set weighting function for the respective row.

* * * * *